(12) United States Patent
Raghavan et al.

(10) Patent No.: US 7,236,757 B2
(45) Date of Patent: *Jun. 26, 2007

(54) HIGH-SPEED MULTI-CHANNEL COMMUNICATIONS TRANSCEIVER WITH INTER-CHANNEL INTERFERENCE FILTER

(75) Inventors: Sreen A. Raghavan, La Jolla, CA (US); Thulasinath G. Manickam, San Diego, CA (US); Peter J. Sallaway, San Diego, CA (US); Gerard E. Taylor, Laguna Nigel, CA (US)

(73) Assignee: Vativ Technologies, Inc., San Diego, CA (US)

( * ) Notice: Subject to any disclaimer, the term of this patent is extended or adjusted under 35 U.S.C. 154(b) by 254 days.

This patent is subject to a terminal disclaimer.

(21) Appl. No.: 10/071,771

(22) Filed: Feb. 6, 2002

(65) Prior Publication Data

US 2003/0087634 A1    May 8, 2003

Related U.S. Application Data

(63) Continuation-in-part of application No. 09/965,242, filed on Sep. 26, 2001, which is a continuation-in-part of application No. 09/904,432, filed on Jul. 11, 2001.

(51) Int. Cl.
*H04B 1/04* (2006.01)
*H04L 27/36* (2006.01)
*H04K 1/10* (2006.01)

(52) U.S. Cl. ............... 455/203; 455/91; 455/114.2; 455/115.1; 455/132; 375/219; 375/260; 375/298

(58) Field of Classification Search ........ 455/295–296, 455/307, 423, 426, 101–104, 114.2, 114.3, 455/115.1, 118, 119, 14–18, 500, 507, 63.1, 455/333, 334, 67.13, 67.11, 91, 132; 325/346–349, 325/362, 234–235, 285, 148; 375/219, 260, 375/298, 322, 350
See application file for complete search history.

(56) References Cited

U.S. PATENT DOCUMENTS 4,025,719 A    5/1977 Nussbaumer
(Continued)

FOREIGN PATENT DOCUMENTS

CN    2161025 Y    4/1994
(Continued)

OTHER PUBLICATIONS

International Search Report for corresponding PCT Application No. PCT/US02/22339, issued Mar. 21, 2003 (4 pages).
(Continued)

*Primary Examiner*—Pablo N. Tran
(74) *Attorney, Agent, or Firm*—Finnegan, Henderson, Farabow, Garrett & Dunner, L.L.P.

(57) ABSTRACT

A communication system is disclosed that allows high data-rate transmission of data between components. N-bit parallel data is transmitted in K-frequency separated channels on the transmission medium so as to fully take advantage of the overall bandwidth of the transmission medium. Additionally, a cross-channel interference filter in a receiver section corrects for cross-channel interference in the communication system. As a result, a very high data-rate transmission can be accomplished with low data-bit transmission on individual channels. A transmitter system and a receiver system are described for the communication system.

41 Claims, 17 Drawing Sheets

U.S. PATENT DOCUMENTS

| | | | |
|---|---|---|---|
| 4,455,649 A | 6/1984 | Esteban et al. | |
| 4,599,732 A | 7/1986 | LeFever | |
| 4,679,225 A * | 7/1987 | Higashiyama | 455/410 |
| 4,710,922 A | 12/1987 | Scott | |
| 4,995,031 A | 2/1991 | Aly et al. | |
| 5,079,770 A | 1/1992 | Scott | |
| 5,285,474 A | 2/1994 | Chow et al. | |
| 5,293,378 A | 3/1994 | Shimizu | |
| 5,535,228 A | 7/1996 | Dong et al. | |
| 5,604,768 A | 2/1997 | Fulton | |
| 5,715,280 A | 2/1998 | Sandberg et al. | |
| 5,796,783 A | 8/1998 | Crawford | |
| 5,808,671 A | 9/1998 | Maycock et al. | |
| 5,822,368 A * | 10/1998 | Wang | 375/229 |
| 5,838,268 A | 11/1998 | Frenkel | |
| 5,838,732 A | 11/1998 | Carney | |
| 5,838,740 A * | 11/1998 | Kallman et al. | 375/346 |
| 5,844,950 A | 12/1998 | Aono et al. | |
| 5,852,629 A | 12/1998 | Iwamatsu | |
| 5,930,231 A | 7/1999 | Miller et al. | |
| 5,991,311 A | 11/1999 | Long et al. | |
| 5,999,575 A | 12/1999 | Tanaka et al. | |
| 6,005,893 A | 12/1999 | Hyll | |
| 6,044,112 A | 3/2000 | Koslov | |
| 6,121,828 A | 9/2000 | Sasaki | |
| 6,128,114 A | 10/2000 | Wingo | |
| 6,160,820 A | 12/2000 | Isaksson et al. | |
| 6,163,563 A * | 12/2000 | Baker et al. | 375/130 |
| 6,246,664 B1 | 6/2001 | Boehm | |
| 6,252,900 B1 | 6/2001 | Liu et al. | |
| 6,259,745 B1 * | 7/2001 | Chan | 375/285 |
| 6,269,129 B1 | 7/2001 | Rhee et al. | |
| 6,275,544 B1 | 8/2001 | Aiello et al. | |
| 6,292,559 B1 | 9/2001 | Gaikwad et al. | |
| 6,351,677 B1 | 2/2002 | Leyonhjelm et al. | |
| 6,407,843 B1 | 6/2002 | Rowan et al. | |
| 6,418,161 B1 | 7/2002 | Shively et al. | |
| 6,438,174 B1 | 8/2002 | Isaksson et al. | |
| 6,441,683 B1 | 8/2002 | Hwang et al. | |
| 6,462,679 B1 | 10/2002 | Van Nguyen | |
| 6,477,207 B1 | 11/2002 | Lindholm | |
| 6,496,540 B1 | 12/2002 | Widmer | |
| 6,522,702 B1 | 2/2003 | Maruyama | |
| 6,529,303 B1 * | 3/2003 | Rowan et al. | 398/82 |
| 6,647,071 B2 | 11/2003 | Sommer et al. | |
| 6,678,319 B1 | 1/2004 | Jamali | |
| 6,714,529 B1 | 3/2004 | Tanabe et al. | |
| 6,724,331 B1 | 4/2004 | El-Ghoroury et al. | |
| 6,731,704 B1 * | 5/2004 | Kiyanagi | 375/346 |
| 6,804,497 B2 | 10/2004 | Kerth et al. | |
| 6,807,234 B2 | 10/2004 | Hansen | |
| 6,831,954 B1 | 12/2004 | Mandyam | |
| 6,970,448 B1 | 11/2005 | Sparrell et al. | |
| 6,975,685 B1 | 12/2005 | Merriam, Jr. | |
| 2001/0031014 A1 | 10/2001 | Subramanian et al. | |
| 2002/0039052 A1 | 4/2002 | Straub et al. | |
| 2002/0086651 A1 | 7/2002 | Prentice et al. | |
| 2002/0093994 A1 | 7/2002 | Hendrickson et al. | |
| 2002/0110206 A1 | 8/2002 | Becker et al. | |
| 2002/0159551 A1 | 10/2002 | Ekvetchavit et al. | |
| 2002/0163974 A1 | 11/2002 | Friedman | |
| 2003/0017809 A1 | 1/2003 | Garlepp et al. | |
| 2003/0054782 A1 | 3/2003 | Snider | |
| 2003/0112798 A1 | 6/2003 | Ziegler et al. | |
| 2004/0091028 A1 | 5/2004 | Aronson et al. | |
| 2004/0106380 A1 | 6/2004 | Vassiliou et al. | |
| 2004/0121753 A1 | 6/2004 | Sugar et al. | |
| 2004/0130483 A1 | 7/2004 | Brilka et al. | |
| 2004/0137941 A1 | 7/2004 | Tanaka et al. | |
| 2004/0162023 A1 | 8/2004 | Cho | |
| 2004/0190660 A1 | 9/2004 | Morris et al. | |

FOREIGN PATENT DOCUMENTS

| | | |
|---|---|---|
| EP | 0554056 B1 | 5/1998 |
| EP | 0987830 A | 3/2000 |
| WO | WO 99/45683 | 9/1999 |
| WO | WO 9945683 A1 * | 9/1999 |
| WO | WO 00/51303 A | 8/2000 |
| WO | WO 03/007564 A | 1/2003 |
| WO | WO 2004/109948 A2 | 12/2004 |

OTHER PUBLICATIONS

Written Opinion for related PCT Application No. PCT/US2004/014538, issued Dec. 7, 2004 (6 pages).

Office Action mailed Mar. 10, 2005 in U.S. Appl. No. 09/904,432.

Response to Office Action dated Aug. 10, 2005 in U.S. Appl. No. 09/904,432.

Office Action mailed Dec. 17, 2004 in U.S. Appl. No. 09/965,242.

Response to Office Action dated Mar. 17, 2005 in U.S. Appl. No. 09/965,242.

Office Action mailed Jun. 28, 2005 in U.S. Appl. No. 09/965,242.

Office Action mailed Oct. 26, 2004 in U.S. Appl. No. 10/167,158.

Clark, Jr., G.C. and Cain, J.B., Error Correction Coding for Digital Communications (Plenum Press, New York 1981) pp. 253-264.

International Search Report dated Jul. 12, 2004, from corresponding PCT Application No. PCT/US04/014538.

Lee, Edward A. and Messerschmitt, David G., Digital Communications (Kluwer Academic Publishers, 1988) pp. 371-402.

Sklar, Bernard, Digital Communications, Fundamentals and Applications (Prentice-Hall, Inc., 1988), pp. 51-244 and 314-535.

Ungerboeck, G., "Channel Coding with Multilevel/Phase Signals," IEEE Transactions on Information Theory, vol lt-28, Jan. 1982, pp. 55-67.

Ungerboeck, G., "Trellis Coding Modulation with Redundant Signal Sets, Part I. Introduction." IEEE Communications Magazine, vol. 25, No. 2, Feb. 1987, pp. 12-21.

Office Action issued by the Chinese IPO on Mar. 17, 2006, with English translation, 18 pages.

Response to Final Office Action filed May 1, 2006 in U.S. Appl. No. 09/965,242.

Final Office Action mailed Nov. 15, 2005 in U.S. Appl. No. 09/904,432.

Response to Final Office Action filed Feb. 15, 2006 in U.S. Appl. No. 09/904,432.

Examination Report for EP Appl. No. 02 748 158.9, dated Dec. 8, 2004, 5 pages.

Response to Examination Report for EP Appl. No. 02 748 158.9, dated Jul. 5, 2005, 23 pages.

Second Examination Report for EP Appl. No. 02 748 158.9, dated Mar. 14, 2006, 10 pages.

Article 34 Amendment for WO Appl. No. PCT/US02/22339, filed Dec. 18, 2003 (31 pages).

Written Opinion for WO Application No. PCT/US02/22339, dated Feb. 13, 2004 (11 pages).

International Preliminary Examination Report for WO Application No. PCT/US02/22339, dated Sep. 17, 2004 (24 pages).

Response to Office Action dated Oct. 28, 2005 in U.S. Appl. No. 09/965,242.

Final Office Action mailed Jan. 30, 2006 in U.S. Appl. No. 09/965,242.

Taiwanese Office Action granting acceptance for Appl. No. 91115102, dated Jul. 13, 2005 (4 pages).

Taiwanese Response to Official Letter for Appl. No. 91115102, dated May 26, 2005 (6 pages).

Taiwanese Official Letter for Appl. No. 91115102, dated May 3, 2005 (3 pages).

International Preliminary Report on Patentability for WO Application No. PCT/US2004/014538, mailed Dec. 22, 2005 (8 pages).

Office Action dated Jul. 26, 2006, in U.S. Appl. No. 09/965,242.

Response to Office Action filed Sep. 12, 2006 in U.S. Appl. No. 09/904,432.

Response to Office Action dated Oct. 8, 2006, to the Chinese IPO.

Response to Second Examination Report for EP Appl. No. 02 748 158.9, dated Sep. 12, 2006.

Response to Office Action dated Oct. 18, 2006, in U.S. Appl. No. 09/965,242.
Office Action dated Nov. 22, 2006, in U.S. Appl. No. 10/310,355.
Preliminary Amendment dated Oct. 18, 2006, in U.S. Appl. No. 10/454,382.
Office Action dated Oct. 31, 2006, in U.S. Appl. No. 10/454,382.
Reply to Office Action dated Nov. 22, 2006, in U.S. Appl. No. 10/454,382.

* cited by examiner

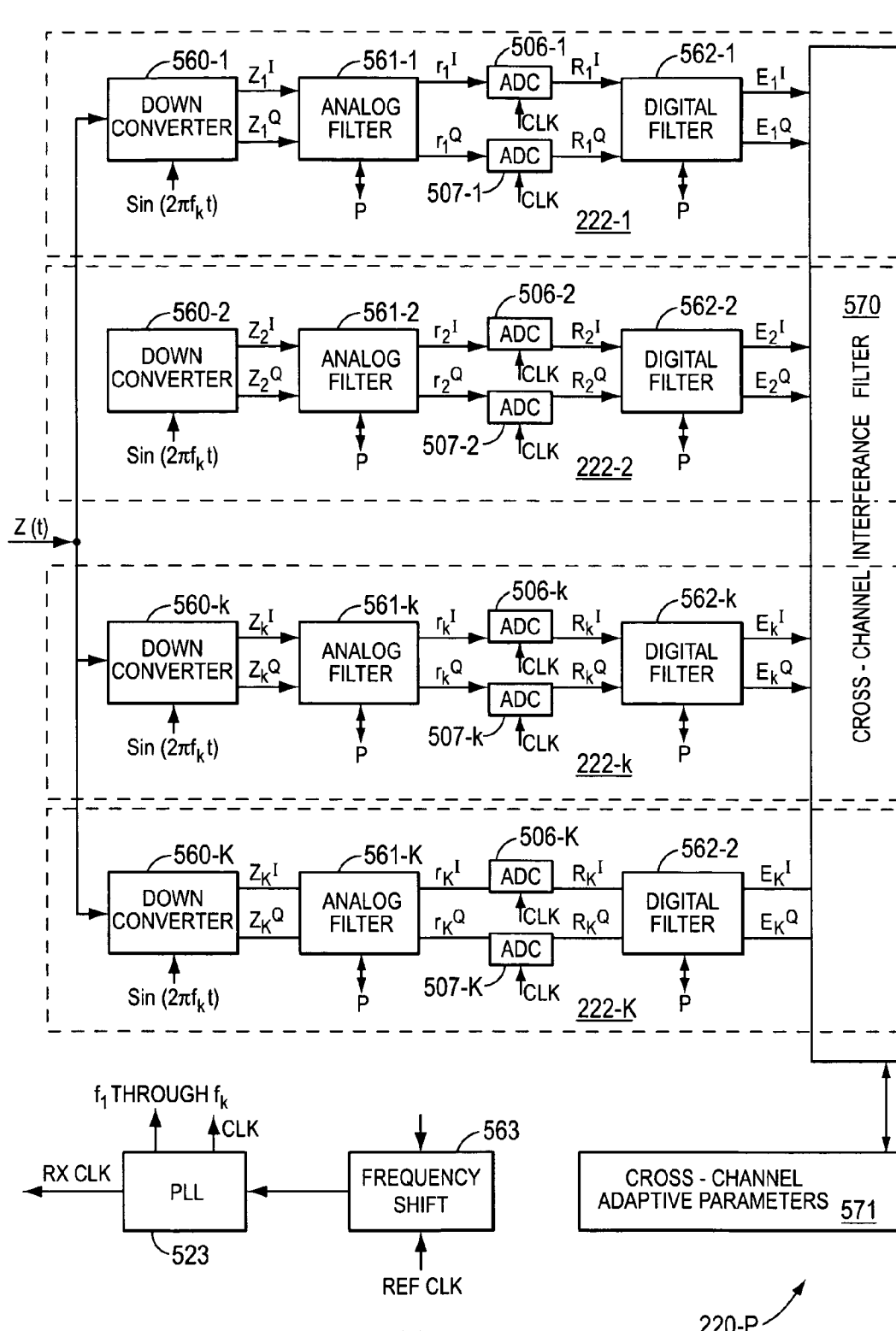
FIG. 5A (PART 1)

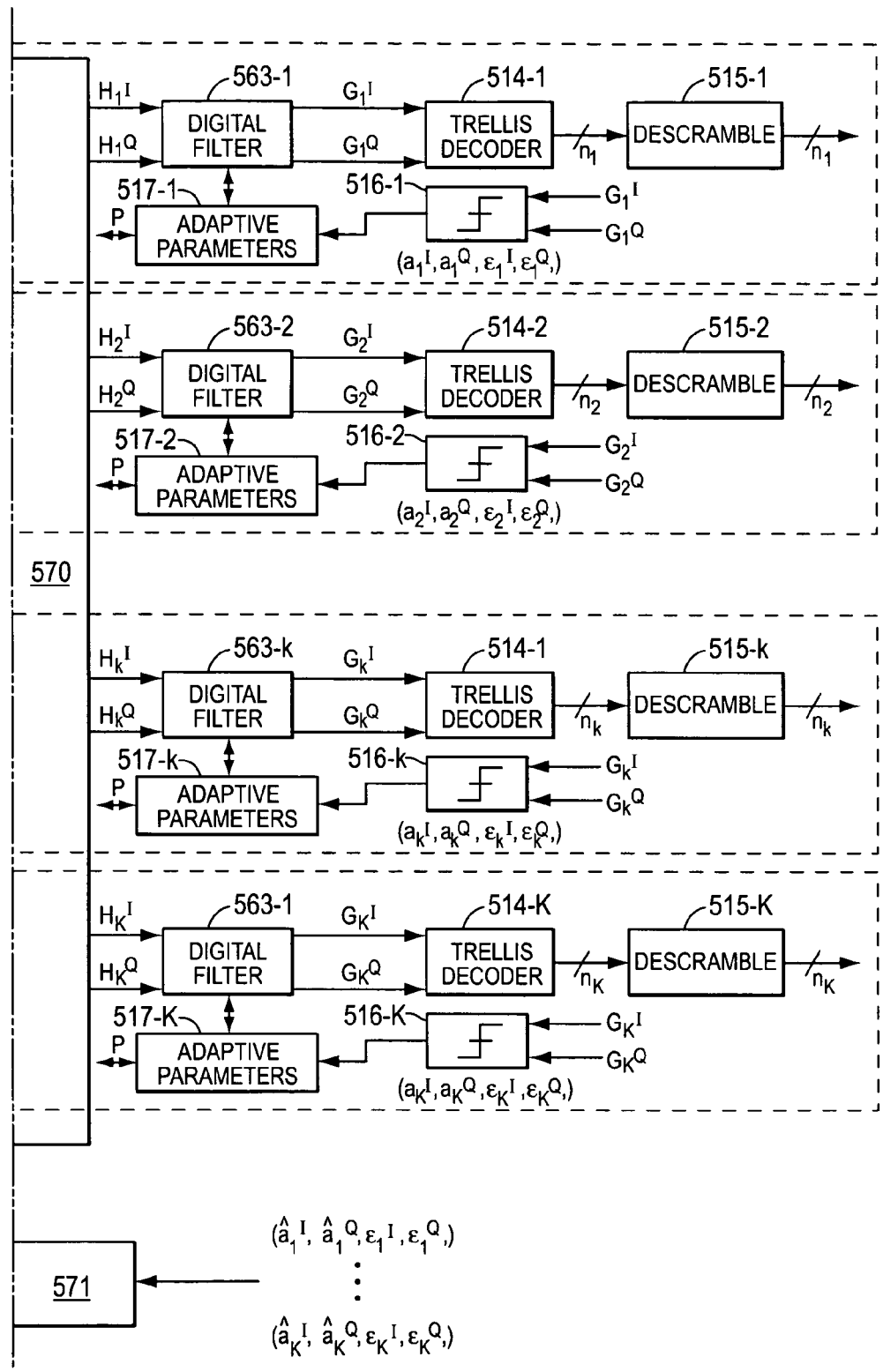
FIG. 5A (PART 2)

HIGH-SPEED MULTI-CHANNEL COMMUNICATIONS TRANSCEIVER WITH INTER-CHANNEL INTERFERENCE FILTER

RELATED APPLICATIONS

The present disclosure is a continuation-in-part of U.S. application Ser. No. 09/965,242 to Sreen Raghavan, Thulasinath G. Manickam, and Peter J. Sallaway, filed Sep. 26, 2001, which is a continuation-in-part of U.S. application Ser. No. 09/904,432, by Sreen Raghavan, filed on Jul. 11, 2001, assigned to the same entity as is the present application, both of which are herein included by reference in their entirety.

BACKGROUND

1. Field of the Invention

The present invention is related to high-speed communications of data in a communication system and, in particular, to high data rate transmission of data between components in a communication system.

2. Discussion of Related Art

Many conventional systems for transmitting data between components within a cabinet or between cabinets of components utilize copper or optical backplanes for transmission of digital data. For example, high data rate transceiver systems are utilized in many backplane environments, including optical switching devices, router systems, switches, chip-to-chip communications and storage area networking switches. Other environments that utilize high speed communication between components include inter-cabinet communications and chip-to-chip communications. Typical separations of components in such systems is between about 0.1 and about 10 meters.

Existing techniques utilized in such environments typically use non-return to zero (NRZ) modulation to send and receive information over high-speed backplanes or for high data rate chip-to-chip interconnects. Typically, the transceiver for sending high-speed data over a backplane is called a serializer/deserializer, or SERDES, device.

FIG. 1A shows a block diagram of a backplane environment 100. Components 101-1 through 101-Q are coupled to transmit and receive data through input/output (I/O) ports 102-1 through 102-Q, respectively, to backplane 110. Conventionally, components 101-1 through 101-Q are SERDES devices.

FIG. 1B shows a block diagram of a conventional transmitter portion of one of SERDES devices 101-1 through 101-Q on I/O ports 102-1 through 102-Q, respectively. Parallel data is received in a bit encoder 105. Bit encoder 105 encodes the parallel data, for example by adding redundancy in the input data, to ensure a minimum rate of data transitions in the output data stream. Typical encoding schemes include rate 8/10 (8 bit input to 10 bit output) encoding. The parallel data is serialized in parallel to serial converter 106. Output driver 107 then receives the serialized data from parallel to serial converter 106 and outputs, usually, a differential voltage signal for transmission over backplane 110. In addition, there is typically a phase locked loop (PLL) 114 that provides the necessary clock signals for encoder 105 and parallel-to-serial converter 106. The input signal to PLL 114 is a reference clock signal from a system PLL 103.

FIG. 1C shows a conventional receiver 108 of one of SERDES devices 101-1 through 101-Q on I/O ports 102-1 through 102-Q, respectively, of FIG. 1A. Input driver 109 receives differential voltage signal from backplane 110 and outputs the analog data signal to clock and data recovery circuit 113. Data recovery 113 can, in some systems, perform equalization, recover the timing and output a serial bit stream of data to serial-to-parallel converter 111. The serial data is input to bit decoder 112 which converts the parallel data to parallel decoded data. Clock and data recovery circuit 113 also outputs the necessary clock signals to serial-to-parallel converter 111 and bit decoder 112.

A conventional SERDES system 100 can enable serial data communication at data rates as high as 2.5 Gbps to 3.125 Gbps over a pair of FR4 copper traces in a copper backplane communication system. One of the biggest problems with existing SERDES systems 100 is that they are very bandwidth inefficient, i.e., they require 3.125 GHz of bandwidth to transmit and receive 2.5 Gbps of data over a single pair of copper wires. Therefore, it is very difficult to increase the data rates across backplane bus 110. Additionally, SERDES system 100 requires the implementation of a high clock rate (3.125 GHz for 2.5 Gbps data rates) phase locked loop (PLL) 114 implemented to transmit data and recover high clock rates in data recovery 113. The timing window within which receiver 108 needs to determine whether the received symbol in data recovery 110 is a 1 or a 0 is about 320 ps for the higher data rate systems. This timing window creates extremely stringent requirements on the design of data recovery 113 and PLL 114, as they must have very low peak-to-peak jitter.

Conventional SERDES system 100 also suffers from other problems, including eye closure due to intersymbol interference (ISI) from the dispersion introduced by backplane 110. The ISI is a direct result of the fact that the copper traces of backplane 110 attenuate higher frequency components in the transmitted signals more than the lower frequency components in the transmitted signal. Therefore, the higher the data rate the more ISI suffered by the transmitted data. In addition, electrical connectors and electrical connections (e.g., vias and other components) used in SERDES device 100 cause reflections, which also cause ISI.

To overcome these problems, equalization must be performed on the received signal in data recovery 113. However, in existing very high data-rate communication systems, equalization is very difficult to perform, if not impossible due to the high baud rate. A more commonly utilized technique for combating ISI is known as "pre-emphasis", or pre-equalization, performed in bit encoder 105 and output driver 107 during transmission. In some conventional systems, the amplitude of the low-frequencies in the transmitted signal is attenuated to compensate for the higher attenuation of the high frequency component by the transmission medium of bus 110. While this makes the receiver more robust to ISI, pre-emphasis reduces the overall noise tolerance of transmission over backplane 110 of backplane communication system 100 due to the loss of signal-to-noise ratio (SNR). At higher data rates, conventional systems quickly become intractable due to the increased demands.

Therefore, there is a need for a more robust system for transmitting data between components on a backplane or data bus at very high speeds.

SUMMARY

In accordance with the present invention, a data transmission system is presented that allows very high data transmission rates over a data bus that utilizes the signal attenuation properties of the copper based backplane interconnect system. In addition, this transmission scheme does not result in increased intersymbol interference at the receiver despite transmitting data at a very high speed. The data transmission system includes a transmitter system and a receiver system coupled through a transmission medium. The transmitter system receives parallel data having N bits and separates the N bits into K subsets for transmission into K frequency separated channels on the transmission medium. The receiver system receives the data from the K frequency separated channels from the transmission medium and recovers the N parallel bits of data. In some embodiments, the N parallel bits are separated into K subsets of bits, the K subsets of bits are encoded into K symbols, each of which is up-converted to a carrier frequency appropriate to one of the K channels. The summed output signal resulting from up-converting into each of the K channels is transmitted over the transmission medium.

Transmitted data in each of the K channels can suffer from inter-symbol interference (IS) as well as cross-channel interference due to harmonic generation in up-conversion and down-conversion processes in the transmitter and receiver. In accordance with the present invention, a receiver which corrects for cross-channel interference as well as for inter-symbol interference is presented.

In some embodiments, the transmitter system includes K separate transmitters. Each of the K transmitters receives a subset of the N-bits, encodes the subset of bits, and modulates the encoded symbols with a carrier signal at a frequency separated from that of others of the K transmitters. The summed signals from each of the K separate transmitters is transmitted over the transmission medium. The transmission medium can be any medium, including optical, infrared, wireless, twisted copper pair, or copper based backplane interconnect channel.

In some embodiments, each of the K transmitters receives a subset of the N data bits, encodes the subset, maps the encoded subset onto a symbol set, and up-converts the analog symbol stream to a carrier frequency assigned to that transmitter. The up-converted symbol stream is then transmitted through the transmission medium to a receiver system having a receiver for down-converting and recovering the data stream transmitted on each of the carrier frequencies. For example, in some embodiments each of the K transmitters receives the subset of bits, encodes them with a trellis encoder and maps them onto a quadrature-amplitude modulated (QAM) symbol set. In some embodiments, the symbols output from the QAM mapping are processed through a digital-to-analog converter before being up-converted to a carrier frequency to produce the output signal from the transmitter. Any encoding and symbol mapping scheme can be utilized.

For example, in one embodiment one of the K channels can be PAM encoded with 0 frequency up-conversion (i.e., base-band transmission). In some embodiments, no cross-channel interference occurs between this channel and other channels which are up-converted to higher carrier frequencies.

Each of the output signals from the K transmitters are summed for transmission in K separate transmission channels on the transmission medium. The receiver receives the summed signals, with data transmitted at K separate channels. In some embodiments, the receiver down-converts the summed signals by the frequency of each of the K separate channels to recover the symbols transmitted in each of the K separate channels. The subsets of digital data can then be recovered from the recovered symbols.

The receiver system receives the combined signal, separates the signal by carrier frequency, and recovers the bits from each carrier frequency. In some embodiments, the signal received from the transmission medium is received into K parallel receivers. Each of the K receivers separates out the signal centered around the carrier frequency allocated to that channel by the transmitter, equalizes the signal, and decodes the signal to retrieve the subset of N bits assigned to the corresponding transmitter modulator.

As a result, parallel streams of serial data bits are separated into separate subsets which are transmitted on different frequency bands to form separate channels on the transmission medium. Therefore, the data rate and the symbol rate transmitted in each of the separate channels can be much lower than the overall data transmission rate. The lower data rate and symbol rate in each channel provides for simpler receiver processing with many fewer problems (e.g., speed of components utilized for equalization and data recovery) than the high data rate transmissions. In addition, because the symbol rates are lower, the amount of receiver equalization needed on each of the K channels can be smaller, and can be implemented with simpler equalization structures. Because of the lower symbol rates, receiver signals can be processed with complex, optimal algorithms.

A complex cross-channel correction algorithm according to the present invention can also be implemented. The cross-channel correction involves adjusting each of the signals of each of the channels by some portions of the signals from the other channels in order to eliminate the interference. The parameters of the cross-channel correction can be adaptively chosen to optimize receiver performance.

In some embodiments, the transmission into each of the available transmission channels can be bit-loaded so that the channels occupying the lower part of the frequency spectrum can be modulated with higher order symbol constellations to provide higher bit throughput per modulated symbol in those channels. Conversely, the channels occupying the higher carrier frequencies can be modulated with lower order symbol constellations to provide lower numbers of bits per modulated symbol. By performing bit-loading, the data throughput that can be achieved over the transmission medium, for example a copper based interconnect system, can be maximized because the signal-to-noise ratio (SNR) available in the channel is higher at lower frequencies in the channel than in the higher frequencies. Thus, the bit-loaded transmission technique can be tailored to maximize the overall capacity of a copper based interconnect system. In embodiments with QAM symbol constellations, for example, QAM constellations with more symbols (and therefore which can carry more bits per symbol) can be transmitted in channels with lower carrier frequencies while QAM constellations with fewer symbols (and therefore representing fewer bits per symbol) can be transmitted in channels with higher carrier frequencies.

A transmission system according to the present invention can include a plurality of transmitters, each of the plurality of transmitters transmitting data in one of a plurality of transmission bands, at least one of the plurality of transmitters comprising a trellis encoder coupled to receive data to be transmitted; a symbol mapper coupled to receive output signals from the trellis encoder; at least one digital to analog converter coupled to receive output signals from the symbol mapper; at least one filter coupled to receive analog output signals from the at least one digital to analog converter; and an up-converter coupled to receive output signals from the at least one filter and shift a frequency of the output signal to an assigned frequency.

The symbol mapper can by any symbol mapper, for example a 128 QAM symbol mapper. The encoder can encode any of the subset of bits, for example the most-significant bit. The filter can be an analog low-pass filter with a cut off frequency and an excess bandwidth that passes a base-band data signal but substantially filters out higher frequency signals. The filter can, in some embodiments, be characterized as a a two-zero, five-pole filter with filter parameters chosen such that an output response of the at least one of the plurality of filters approximates a square root raised cosine function.

A transmission system in accordance with the present invention can include a plurality of receivers and a cross-channel interference canceller coupled to each of the receivers. Each of the plurality of receivers receives signals from one of a plurality of transmission bands. In some embodiments, at least one of the plurality of receivers includes a down converter that converts an input signal from the one of the plurality of transmission bands to a base band; a filter coupled to receive signals from the down converter, the filter substantially filtering out signals not in the base band; an analog-to-digital converter coupled to receive signals from the filter and generate digitized signals; an equalizer coupled to receive the digitized signals; and a trellis decoder coupled to receive signals from the equalizer and generate recreated data, the recreated data being substantially the same data transmitted by a corresponding transmitter. In some embodiments, the cross-channel interference canceller can be coupled to receive output signals from each of the equalizers and to provide signals to a digital filter or the trellis decoder.

In some embodiments, the filter includes filters that can be characterized with two-zero, five-pole functions with parameters chosen such that the response of the filters is substantially a square root raised cosine function. In some embodiments, the transmit and receive filters are chosen to be substantially the same and the combination set to provide overall filtering.

In some embodiments, the down-converter generates in-phase and quadrature signals by multiplying the input signal with a cosine function and a sine function, respectively, with frequency equal to an estimate of the center frequency of the transmission band. In some embodiments, the output signals from the down converter may be offset. In some embodiments, the offset values can be set such that output signals from the analog-to-digital converters average 0. In some embodiments, a small rotation and amplitude adjustment can be applied between digitized in-phase and quadrature signals. In some embodiments, a phase rotation can be applied to digitized in-phase and quadrature corrections. Further, a digital offset can be applied to the digitized in-phase and out-of-phase signals. Further, a quadrature correction can be applied to the output signals from the equalizer. Additionally, further amplification can be applied to the output signals from the equalizer. Additionally, a further offset can be applied to the output signals from the equalizer such that an error signal between sliced values and input values to a slicer are zero averaged. Parameters for offsets, amplifiers, phase rotators, quadrature rotators, the cross-coupling interference filter and equalizers can be adaptively chosen.

These and other embodiments are further discussed below with respect to the following figures.

SHORT DESCRIPTION OF THE FIGURES

FIG. 5A shows a block diagram of an embodiment of a receiver according to the present invention.

In the figures, elements designated with the same identifications on separate figures are considered to have the same or similar functions.

DETAILED DESCRIPTION

Figure 1B:
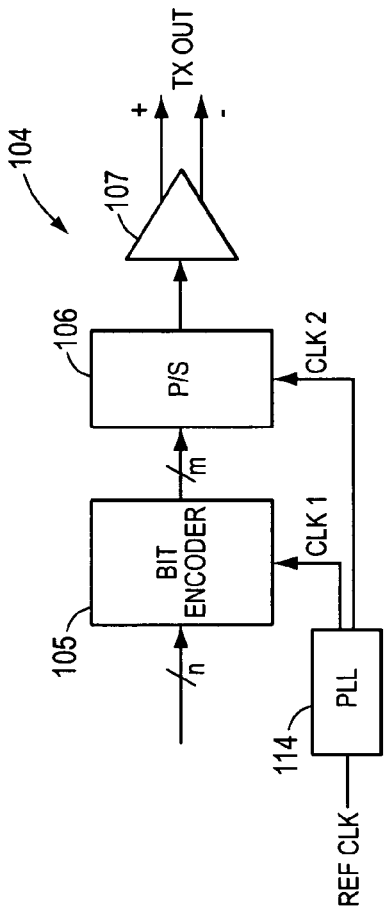
FIGS. 1A, 1B and 1C show block diagrams for a conventional system of transmitting data over a backplane.
Figure 1C:
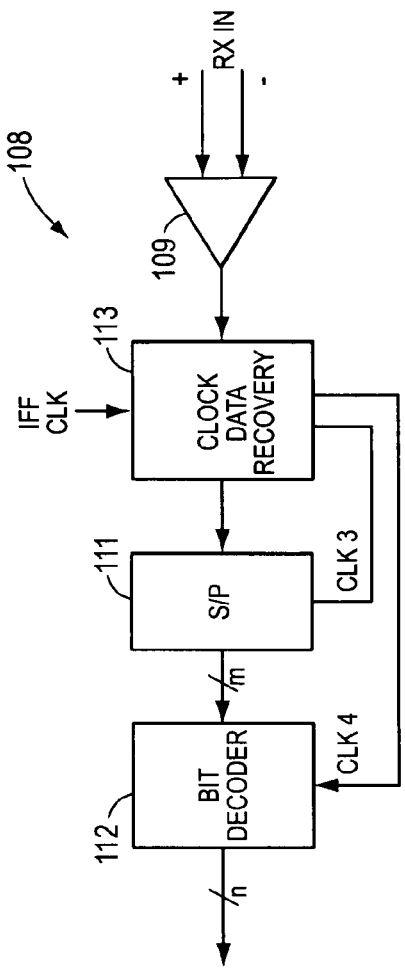
Figure 1A:
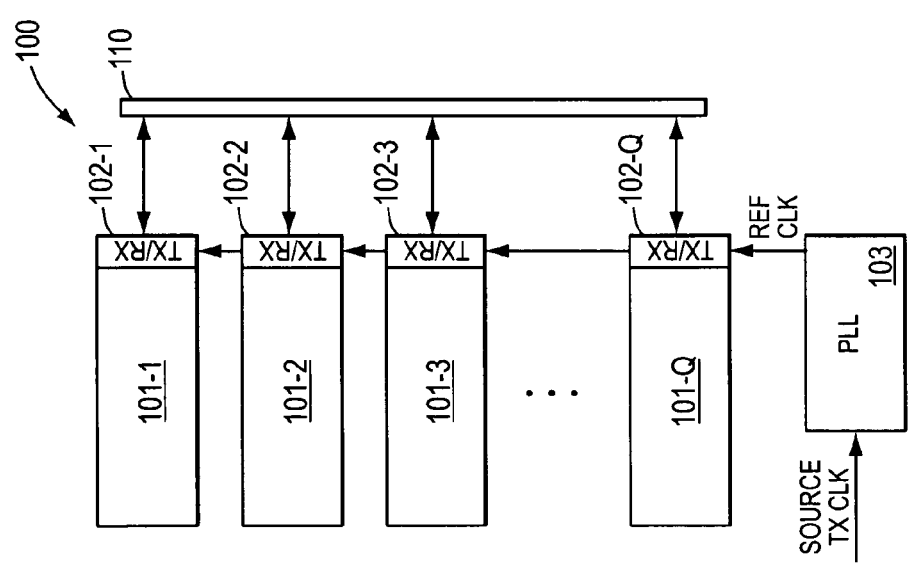
Figure 2A:
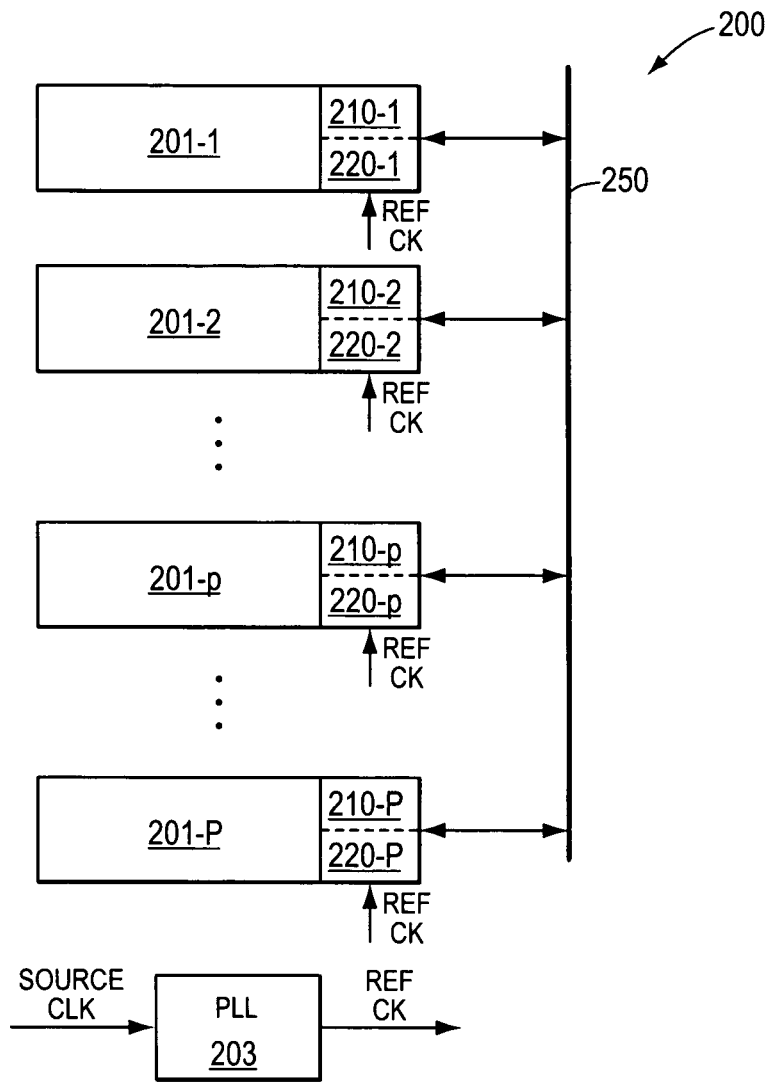
FIG. 2A shows a block diagram of a transmission system according to the present invention.

FIG. 2A shows a block diagram of a transmission system 200 according to the present invention. System 200 includes any number of components 201-1 through 201-P, with component 201-p representing an arbitrary one of components 201-1 through 201-P, coupled through a transmission medium 250. Transmission medium 250 may couple component 201-p to all of the components 201-1 through 201-P or may couple component 201-p to selected ones of components 201-1 through 201-P. In some embodiments, components 201-1 through 201-P are coupled through FR4 copper traces.

System 200 can represent any backplane system, any chassis-to-chassis digital communication system, or any chip-to-chip interconnect with components 201-1 through 201-P representing individual cards, cabinets, or chips, respectively.

Transmission channel 250 can represent any transmission channel, including optical channels, wireless channels, or metallic conductor channels such as copper wire or FR4 copper traces. Typically, transmission channel 250 attenuates higher frequency signals more than lower frequency signals. As a result, intersymbol interference problems are greater for high data rate transmissions than for lower data rate transmissions. In addition, cross-talk from neighboring signals increases with transmission frequency.

Components 201-1 through 201-P include transmitter systems 210-1 through 210-P, respectively, and receiver systems 220-1 through 220-P, respectively. In operation, one of transmitter systems 210-1 through 210-P from one of components 201-1 through 201-P is in communication with one of receiver systems 220-1 through 220-P from a different one of components 201-1 through 201-P. Further, in some embodiments, timing for all of components 201-1 through 201-P can be provided by a phase-locked-loop (PLL) 203 synchronized to a transmit source clock signal. In some embodiments, PLL 203 provides a reference clock signal and each of components 201-1 through 201-P can include any number of phase locked loops to provide internal timing signals.

In some systems, for example backplane systems or cabinet interconnects, the transmission distance through transmission channel 250, i.e. the physical separation between components 201-1 through 201-P, can be as low as 1 to 1.5 meters. In some chip-to-chip environments, the physical separation between components 201-1 though 201-P can be much less (for example a few millimeters or a few centimeters). In some embodiments of the present invention, separations between components 201-1 through 201-P as high as about 100 meters can be realized. Furthermore, in some embodiments transmission channel 250 can be multiple twisted copper pair carrying differential signals between components 201-1 through 201-P. In some embodiments, components 201-1 through 201-P can share wires so that fewer wires can be utilized. In some embodiments, however, dedicated twisted copper pair can be coupled between at least some of components 201-1 through 201-P. Further, transmission medium 250 can be an optical medium, wireless medium, or data bus medium.

Figure 2B:
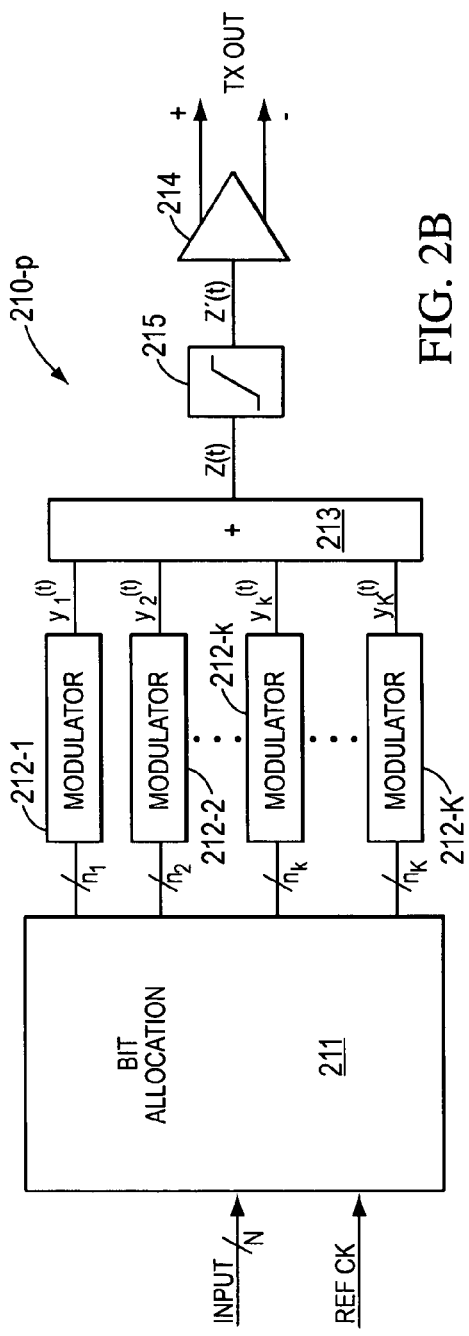
FIG. 2B shows a block diagram of a transmitter according to the present invention.

FIG. 2B shows a block diagram of an embodiment of transmitter system 210-p, an arbitrary one of transmitter systems 210-1 through 210-P. Transmitter system 210-p receives an N-bit parallel data signal at a bit allocation block 211. Bit allocation block 211 also receives the reference clock signal from PLL 203. Bit allocation block 211 segregates the N input bits into K individual channels such that there are $n_1$ through $n_K$ bits input to transmitters 212-1 through 212-K, respectively. In some embodiments, each of the N bits is assigned to one of the K individual channels so that the sum of $n_1$ through $n_K$ is the total number of bits N. In some embodiments, bit allocation block 211 may include error pre-coding, redundancy, or other overall encoding such that the number of bits output, i.e.

$$\sum_{i=1}^{K} n_i,$$

is greater than N.

Figure 3:
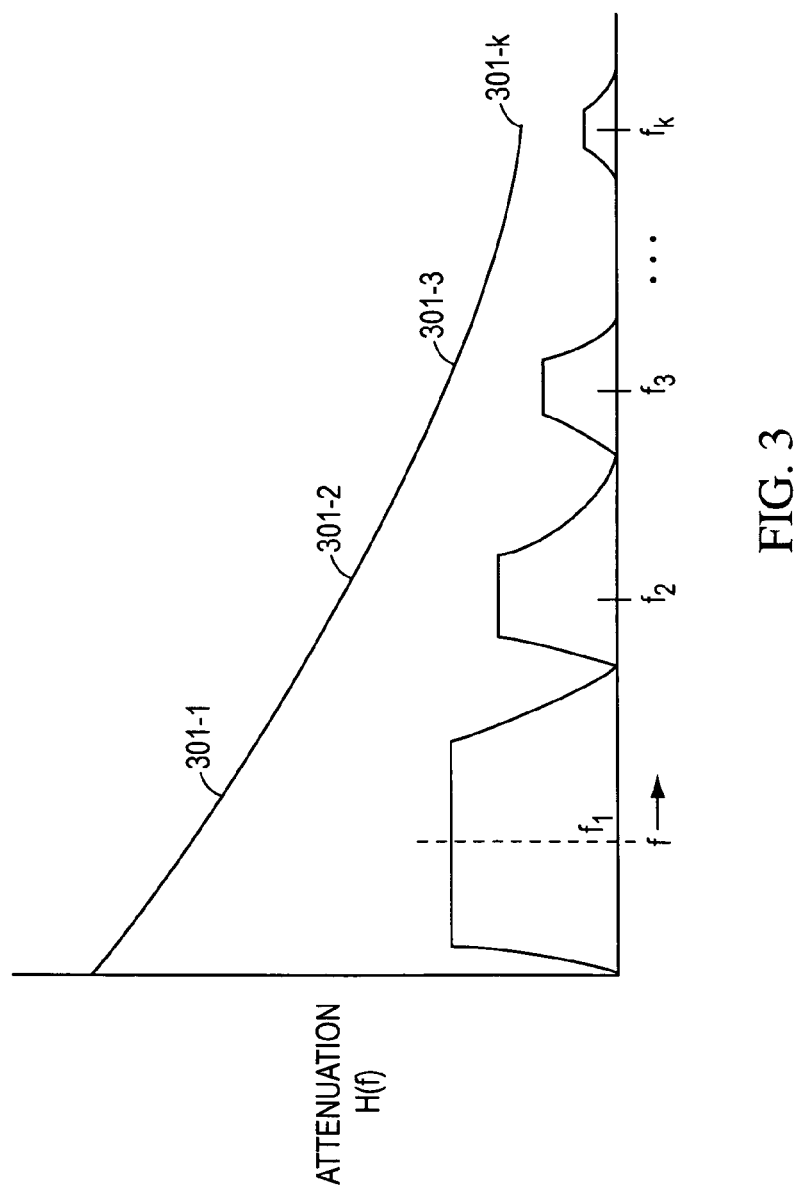
FIG. 3 shows a graph of attenuation versus transmission band on the transmission medium according to the present invention.

Each of transmitters 212-1 through 212-K encodes the digital data input to it and outputs a signal modulated at a different carrier frequency. Therefore, the $n_k$ digital data bits input to transmitter 212-k, an arbitrary one of transmitters 212-1 through 212-K, is output as an analog signal in a kth transmission channel at a carrier frequency $f_k$. FIG. 3 shows schematically the transport function for a typical transmission channel 250 (FIG. 2A), H(f). As is shown, the attenuation at higher frequencies is greater than the attenuation at lower frequencies. Transmitters 212-1 through 212-K transmit analog data at carrier frequencies centered about frequencies $f_1$ through $f_K$, respectively. Therefore, transmitters 212-1 through 212-K transmit into transmission channels 301-1 through 301-K, respectively. In some embodiments, the width of each of transmission channels 301-1 through 301-K can be the same. The width of the bands of each of transmission channels 301-1 through 301-K can be narrow enough so that there is little to no overlap between adjacent ones of transmission channels 301-1 through 301-K. In some embodiments, since the attenuation for the lower frequency channels is much smaller than the attenuation for the higher frequency channels, lower frequency channels can be bit-loaded to carry a higher number of bits per baud interval than the number of bits per baud interval that can be carried at higher carrier frequencies.

The analog output signal from each of transmitters 212-1 through 212-K, $y_1(t)$ through $y_K(t)$, then represents the transmission signal in each of channels 301-1 through 301-K, respectively. Signals $y_1(t)$ through $y_K(t)$, then, are input to summer 213 and the summed analog signal z(t) is input to output driver 214. In some embodiments, output driver 214 generates a differential transmit signal corresponding to signal z(t) for transmission over transmission medium 250. Output driver 214, if transmission medium 250 is an optical medium, can also be an optical driver modulating the intensity of an optical signal in response to the signal z(t).

Figure 2C:
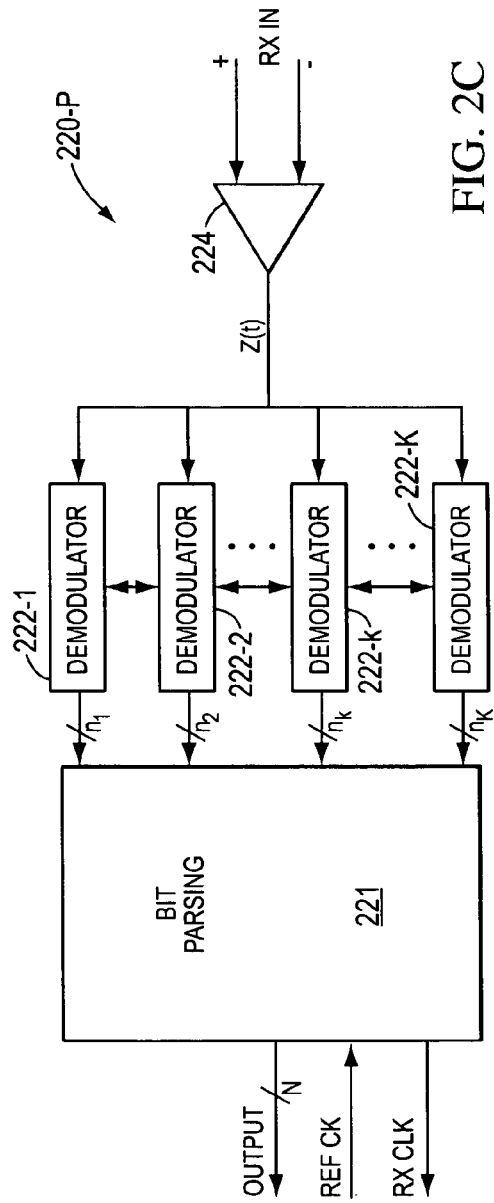
FIG. 2C shows a block diagram of a receiver according to the present invention.

FIG. 2C shows an embodiment of a receiver system 220-p, which can be an arbitrary one of receiver systems 220-1 through 220-P of FIG. 2A. Receiver system 220-p can receive a differential receive signal, which originated from one of transmitter systems 210-1 through 210-P, into an input buffer 224. In some embodiments, an optical signal can be received at input buffer 224, in which case input buffer 224 includes an optical detector. The output signal from input buffer 224, Z(t), is closely related to the output signal z(t) of summer 213. However, the signal Z(t) shows the effects of transmission through transmission medium 250 on z(t), including intersymbol interference (ISI).

The signal Z(t) is input to each of receivers 222-1 through 222-K. Receivers 222-1 through 222-K demodulate the signals from each of the transmission channels 301-1 through 301-K, respectively, and recovers the bit stream from each of carrier frequencies $f_1$ through $f_K$, respectively. The output signals from each of receivers 222-1 through 222-K, then, include parallel bits $n_1$ through $n_K$, respectively. The output signals are input to bit parsing 221 where the transmitted signal having N parallel bits is reconstructed. Receiver system 220-p also receives the reference clock signal from PLL 203, which can be used to generate internal timing signals. Furthermore, receiver system 220-p outputs a receive clock signal with the N-bit output signal from bit parsing 221.

Further, demodulators (receivers) 222-1 through 222-K are coupled so that cross-channel interference can be cancelled. As discussed further below, due to the mixers in the up-conversion process, multiple harmonics of each signal may be generated from each of transmitters 212-1 through 212-K. For example, in some embodiments transmitters 212-1 through 212-K transmit at carrier frequencies $f_1$ through $f_K$ equal to $f_0$, $2f_0$ . . . $Kf_0$, respectively. In some embodiments, one of transmitters 212-1 through 212-K may transmit at the base-band frequency, e.g. transmitter 212-1 may transmit at 0 carrier frequency while transmitters 212-2 through 212-K transmit at frequencies $f_2$ through $f_K$, respectively. Again, frequencies $f_2$ through $f_K$ can be frequencies $f_0, 2f_0 \ldots (K-1)f_0$, respectively.

Due to the harmonics in the mixer, the signal transmitted at carrier frequency $f_1$ will also be transmitted in the base band and at frequencies $2f_1, 3f_1, \ldots$. Additionally, the signal transmitted at carrier frequency $f_2$ will also be transmitted in the base band and at $2f_2, 3f_2, \ldots$. Therefore, any time any of the bandwidth of any harmonics of the channels overlap with other channels or the other channel's harmonics, significant cross-channel symbol interference can occur due to harmonics in the mixers of transmitters 212-1 through 212-K. For example, in the case where the carrier frequencies are multiples of $f_0$, channel 1 transmitting at $f_0$ will also transmit at $0, 2f_0 3f_0, \ldots$, i.e. into each of the other channels. Additionally, the down converters also create harmonics, which means that some of the transmission of the third channel will be down-converted into the first channel, for example. Therefore, further cross-channel interference can be generated in the down-conversion process of receivers 221-1 through 222-K. Embodiments of the present invention correct for the cross-channel symbol interference as well as the inter-symbol interference. Note that it is well known that if the duty cycle of the harmonic wave that is being mixed with an input signal is 50%, only odd harmonics will be generated. Even harmonics require higher or lower duty cycles.

In some embodiments, N-bits of high-speed parallel digital data per time period is input to bit allocation 211 of transmitter system 210-p along with a reference clock signal. Data is transmitted at a transmit clock rate of CK1, which can be determined by an internal phase-locked-loop from the reference clock signal. Each of these input signals of N-bits can change at the rate of a transmit clock signal CK1. The transmit clock signal CK1 can be less than or equal to ηGHz/N, where η represents the total desired bit rate for transmission of data from transmitter system 210-p over transmission medium 250. The resultant maximum aggregate input data rate, then, equals ηGbps. The ηGbps of aggregate input data is then split into K sub-channels 301-1 through 301-K (see FIG. 3) which are generated by transmitters 212-1 through 212-K, respectively, such that:

$$\sum_{k=1}^{K} B_k n_k = \eta \, Gbps, \quad (1)$$

where $n_k$ is the number of bits transmitted through the kth transmission band, centered about frequency $f_k$, with a symbol baud rate on the $k^{th}$ sub-channel being equal to $B_k$.

In some embodiments of the invention, each of transmitters 212-1 through 212-K operate at the same baud rate $B_k$. Furthermore, the center frequency of transmitter 212-k (corresponding to channel k), or one of its harmonics, is substantially the same as harmonics of the center frequencies of other ones of transmitters 212-1 through 212-K. One skilled in the art will recognize that in other embodiments of the invention one or both of these conditions may not be satisfied.

In some embodiments of the invention, each of the K sub-channels 301-1 through 301-K can have the same baud rate B. In general, the baud rate $B_k$ of one sub-channel 301-k, which is an arbitrary one of sub-channels 301-1 through 301-K, can differ from the baud rate of other sub-channels. Additionally, bit-loading can be accomplished by choosing symbol sets which carry a larger number of bits of data for transmission channels at lower frequencies and symbol sets which carry a lower number of bits of data for transmission channels at higher frequencies (i.e., $n_k$ is higher for lower frequencies).

In the case of a copper backplane interconnect channel of trace length 1<2 meters, for example, the signal-to-noise ratio of the lower carrier frequency channels is substantially greater than the signal-to-noise ratio available on the higher sub-channels because the signal attenuation on the copper trace increases with frequency and because the channel noise resulting from alien signal cross-talk increases with frequency. These properties of the copper interconnect channel can be exploited to "load" the bits/baud of the K sub-channels so that the overall throughput of the interconnect system is maximized. For example, digital communication signaling schemes (modulation+coding), see, e.g. BERNARD SKLAR, DIGITAL COMMUNICATIONS, FUNDAMENTALS AND APPLICATIONS (Prentice-Hall, Inc.,1988), can be utilized that provide higher bit density per baud interval over channels occupying the lower region of the frequency spectrum, and that result in lower bit density over channels that occupy higher frequencies. This "bit-loading" is especially important when the data rates over copper interconnect channel need to be increased, for example to a rate in excess of 10 Gbps per differential copper pair.

Figure 4:
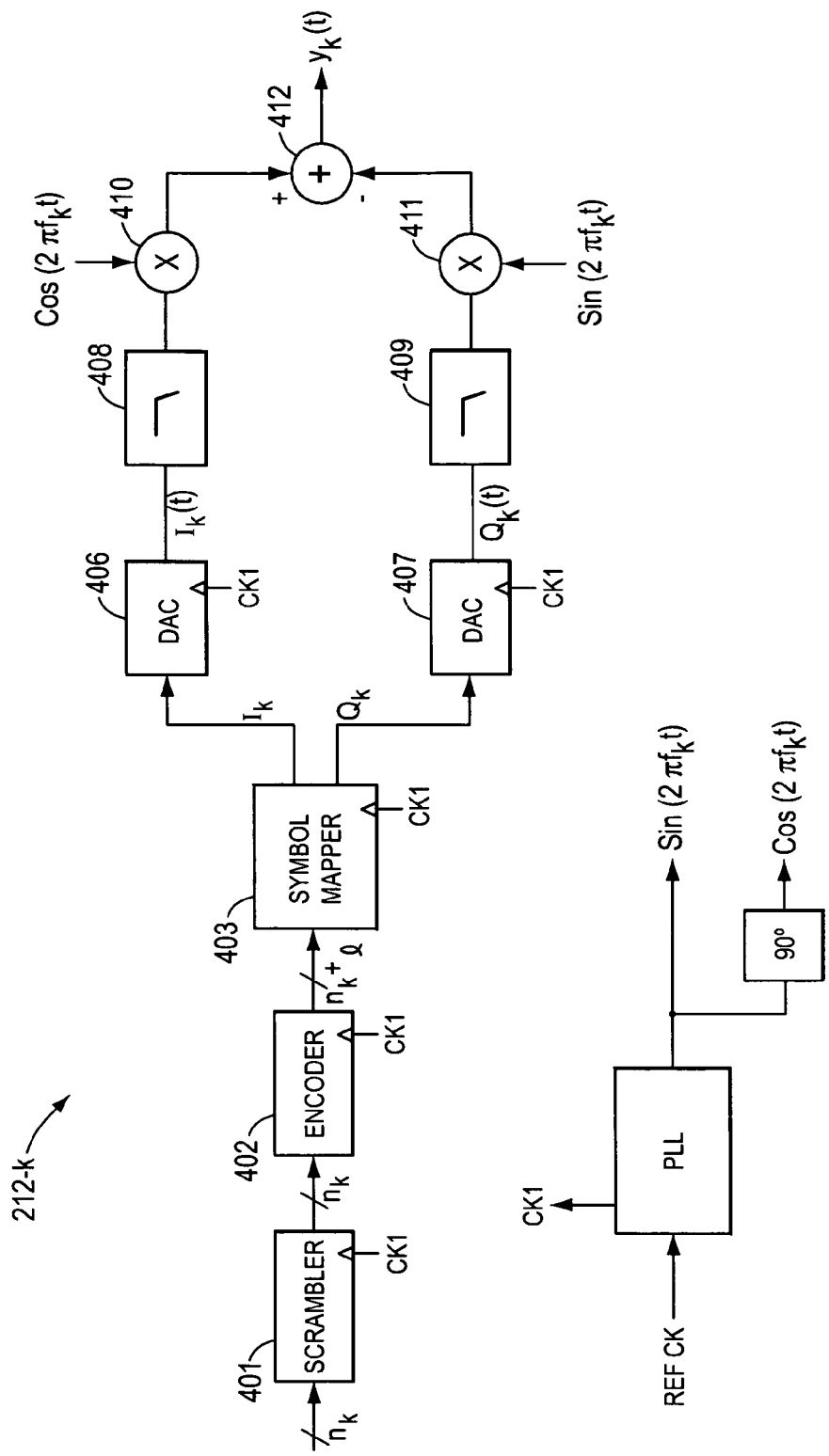
FIG. 4 shows a block diagram of an embodiment of a transmission modulator according to the present invention.

FIG. 4 shows an embodiment of transmitter 212-k, an arbitrary one of transmitters 212-1 through 212-K. Transmitter 212-k receives $n_k$ bits per baud interval, $1/B_k$, for transmission into sub-channel 301-k. The $n_k$ bits are received in scrambler 401. Scrambler 401 scrambles the $n_k$ bits and outputs a scrambled signal of $n_k$ bits, which "whitens" the data.

The output signal of $n_k$ parallel bits is then input to encoder 402. Although any encoding scheme can be utilized, encoder 402 can be a trellis encoder for the purpose of providing error correction capabilities. Trellis coding allows for redundancy in data transmission without increase of baud rate, or channel bandwidth. Trellis coding is further discussed in, for example, BERNARD SKLAR, DIGITAL COMMUNICATIONS, FUNDAMENTALS AND APPLICATIONS (Prentice-Hall, Inc.,1988), G. Ungerboeck., "Trellis Coding Modulation with Redundant Signal Sets, Part I. Introduction," IEEE Communications Magazine, vol. 25, no. 2, February 1987, pp. 5-11, and G. Ungerboeck., "Trellis Coding Modulation with Redundant Signal Sets, Part II. State of the Art," IEEE Communications Magazine, vol. 25, no. 2, February 1987, pp. 12-21. Other encoding schemes include block coding schemes such as Reed-Solomon encoders, and BCH encoders, see, e.g., G. C. CLARK, JR., AND J. B. CAIN., ERROR CORRECTION CODING FOR DIGITAL COMMUNICATIONS (Plenum Press, New York, 1981), however they result in an increase of channel bandwidth usage. Typically, the signal output from encoder 402 includes more bits than $n_k$, $n_k$+1e. In some embodiments, encoder 402 can be a trellis encoder which adds one additional bit, in other words encoder 402 can be a rate $n_k/n_k+1$ encoder, see, e.g., G. Ungerboeck., "Trellis Coding Modulation with Redundant Signal Sets, Part I. Introduction," IEEE Communications Magazine, vol. 25, no. 2, February 1987, pp. 5-11, and G. Ungerboeck., "Trellis Coding Modulation with Redundant Signal Sets, Part II. State of the Art," IEEE Communications Magazine, vol. 25, no. 2, February 1987, pp. 12-21. In some embodiments, additional bits can be added to insure a minimum rate of transitions so that timing recovery can be efficiently accomplished at receiver 220-p.

Figure 6A:
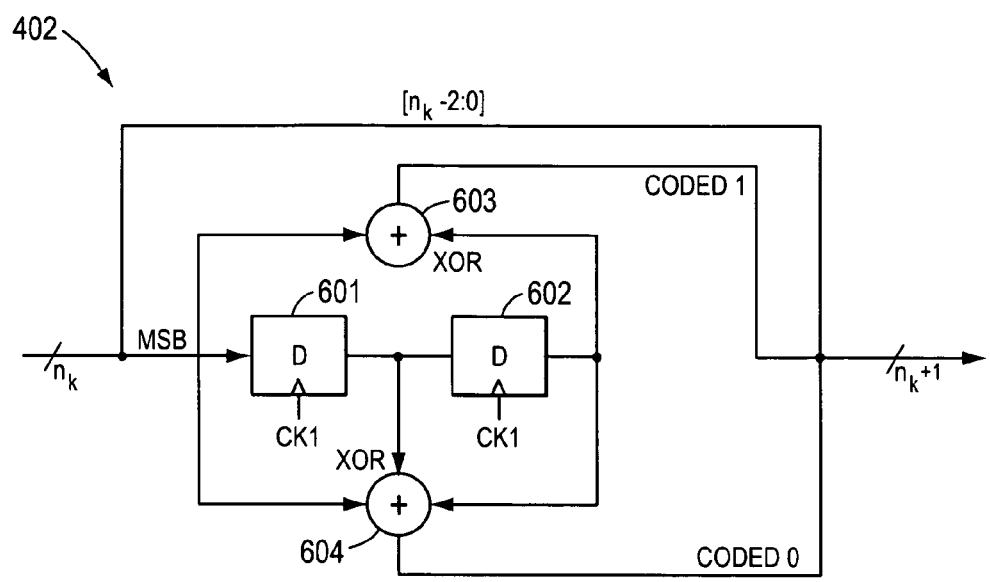
FIG. 6A shows a schematic diagram of a trellis encoder according to the present invention.

FIG. 6A shows an embodiment of encoder 402. Encoder 402 of FIG. 6A is an $n_k/n_k+1$ trellis encoder. Encoder 402 of FIG. 6A performs a rate ½ convolutional coding on the most-significant-bit (MSB) of the $n_k$ bit input signal. The MSB is input to delay 601. The output signal from delay 601 is input to delay 602. The MSB and the output signal from delay 602 are input to XOR adder 603. The output from XOR adder 603 provides a coded bit. The MSB, the output signal from delay 601, and the output signal from delay 602 are XORed in adder 604 to provide another coded bit. The two coded bits are joined with the remaining $n_k$-1 bits to form a $n_k$+1 bit output signal. Delays 601 and 602 are each clocked at the symbol baud rate B. One skilled in the art will recognize that other embodiments of encoder 402 can be utilized with embodiments of this invention.

In transmitter 212-k of FIG. 4, the output signal from encoder 402 is input to symbol mapper 403. Symbol mapper 403 can include any symbol mapping scheme for mapping the parallel bit signal from encoder 402 onto symbol values for transmission. In some embodiments, symbol mapper 403 is a QAM mapper which maps the ($n_k$+le) bits from encoder 402 onto a symbol set with at least $2^{(n_k+le)}$ symbols. As shown in FIG. 6A, le=1 in the output signal from encoder 402. A trellis encoder in conjunction with a QAM mapper can provide a trellis encoded QAM modulation for sub-channel 301-k.

Figure 6B:
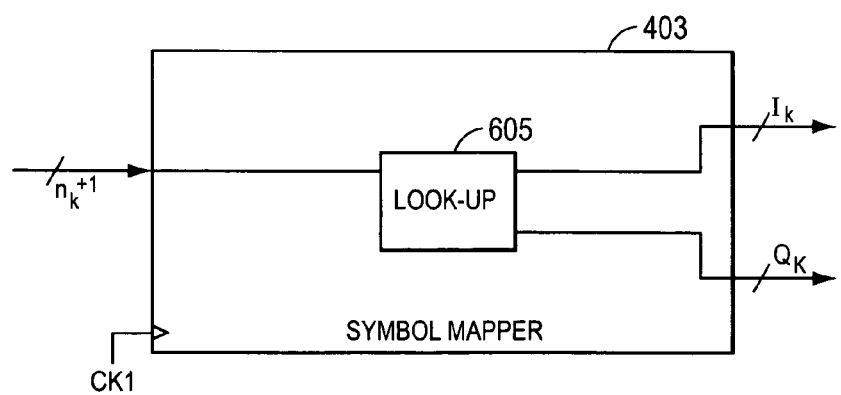
FIG. 6B shows a schematic diagram of a symbol mapper according to the present invention.

FIG. 6B shows an embodiment of symbol mapper 403. Symbol mapper 403 receives the $n_k$+1 data bits from encoder 402 and generates a symbol which can include an in-phase component $I_k$ and a quadrature component $Q_k$. In some embodiments, symbol mapper 403 includes a look-up table 605 which maps the $n_k$+1 input bits to the complex output symbol represented by $I_k$ and $Q_k$.

Table I shows an example symbol look-up table for conversion of a 7-bit data signal into a 128-symbol QAM scheme. Table entries are in decimal format with the in-phase values along the bottom row and the quadrature values represented along the last column. From Table I, a decimal value of 96, for example, results in an I value of −1 and a Q value of −1.

Figures 6C, 6D:
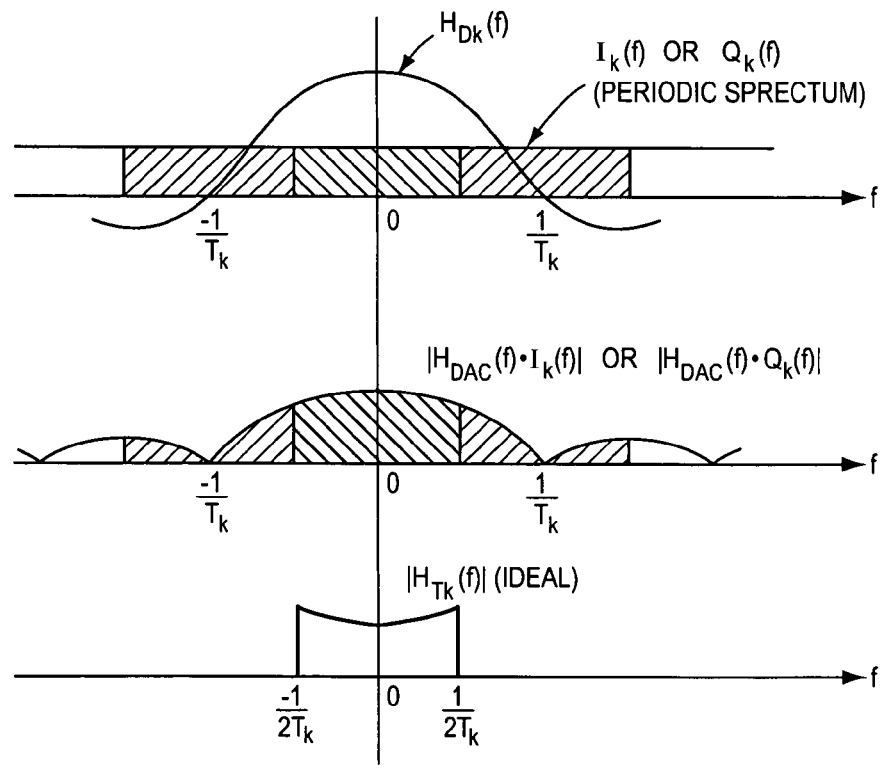
FIG. 6C shows a schematic diagram of a 128 QAM constellation.
FIG. 6D shows filtering of the output signal from a digital to analog converter according to the present invention.

In some embodiments, the QAM mapping can be segregated into groups of four as is shown in FIG. 6C. In some embodiments, with a 128 QAM system, then $n_k$+1 is 7. The two control bits from encoder 402 are arranged so that in groups of four symbols, the two control bits determine placement in the group. Control bits 00 and 11 and control bits 01 and 10 are in opposite corners of the groupings of four. This leads to a 6 dB gain in decoding at the receiver using this mapping scheme. Furthermore, the remaining five bits determine the actual grouping of four.

The output signal from symbol mapper 403 can be a complex signal represented by in-phase signal $I_k$(n) and a quadrature signal $Q_k$(n), where n represents the nth clock cycle of the clock signal CK1, whose frequency equals the baud rate $B_k$. Each of signals $I_k$(n) and $Q_k$(n) are digital signals representing the values of the symbols they represent. In some embodiments, a QAM mapper onto a constellation with 128 symbols can be utilized. An embodiment of a 128-symbol QAM constellation is shown in Table I. Other constellations and mappings are well known to those skilled in the art, see, e.g., BERNARD SKLAR, DIGITAL COMMUNICATIONS, FUNDAMENTALS AND APPLICATIONS (Prentice-Hall, Inc.,1988) and E. A. LEE AND D. G. MESSERSCHMITT, DIGITAL COMMUNICATIONS (Kluwer Academic Publishers, 1988). The number of distinct combinations of $I_k$(n) and $Q_k$(n), then, represents the number of symbols in the symbol set of the QAM mapping and their values represent the constellation of the QAM mapping.

The signals from symbol mapper 403, $I_k$(n) and $Q_k$(n), are input to digital-to-analog converters (DACs) 406 and 407, respectively. DACs 406 and 407 operate at the same clock rate as symbol mapper 403. In some embodiments, therefore, DACs 406 and 407 are clocked at the symbol rate, which is the transmission clock frequency $B_k$.

The analog output signals from DACs 406 and 407, represented by $I_k$(t) and $Q_k$(t), respectively, can be input to low-pass filters 408 and 409, respectively. Low pass filters 408 and 409 are analog filters that pass the symbols represented by $I_k$(t) and $Q_k$(t) in the base band while rejecting the multiple frequency range reflections of the base band signal. FIG. 6D shows a schematic diagram of the ideal requirements for filters 408 and 409. The filter function h(f) cuts off to include all of the base band signal while rejecting all of the higher frequency reflections of the base band signal created by DACs 406 and 407.

Figure 6E:
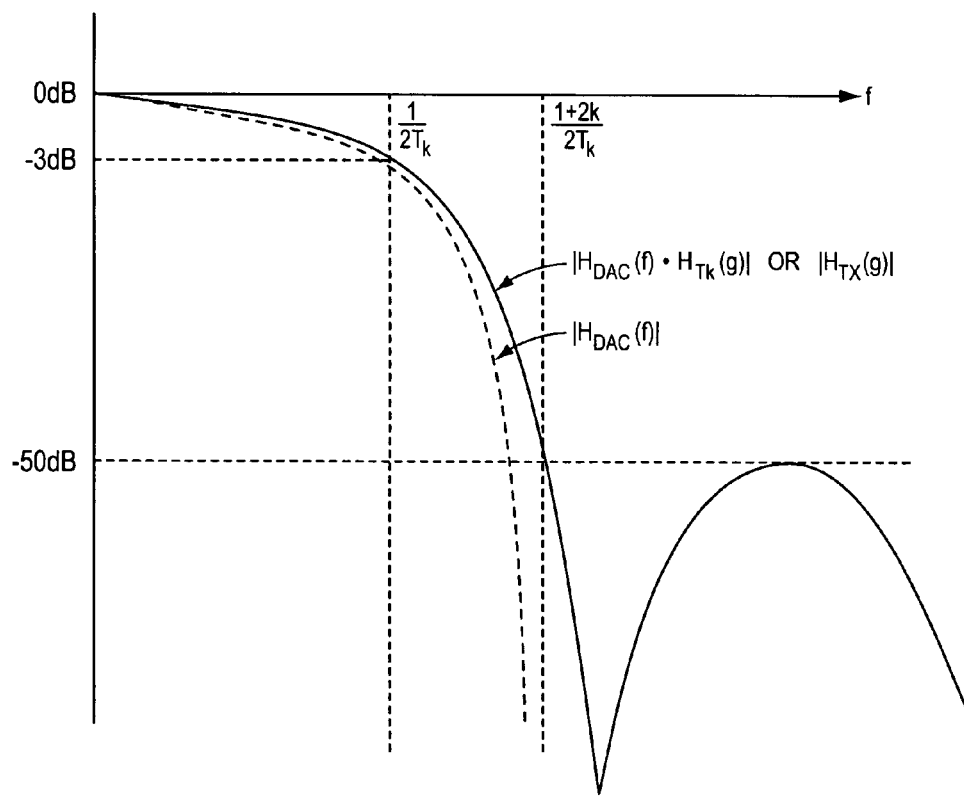
FIG. 6E shows raised square root cosine filter response.

An example embodiment of filters 408 and 409 can be described by a two-zero, five-pole filter function of the form $$H_{TX}(s) = \frac{b_2 s^2 + b_1 s + b_0}{s^5 + a_4 s^4 \cdots + a_0}, \quad (2)$$

where s=i(2πf) (i is $\sqrt{-1}$) and the coefficients $b_2$, $b_1$, $b_0$, and $a_4$ through $a_0$ are the parameters of filters 408 and 409. The parameters for filters 408 and 409, then, can be found by minimizing the cost function $$\int_0^\infty |H_{DAC}(f) H_{TX}(s) - H_{RRC}(f) e^{-j2\pi f \tau}|^2 W(f) df, \quad (3)$$

where $H_{DAC}$(f) is the response of DACs 406 and 407, which can be given by $$H_{DAC}(f) = \frac{\sin(\pi f T_k)}{\pi f}, \quad (4)$$

where $T_k$ is the symbol period, W(f) is a weighting function, $H_{RRC}$(f) is a target overall response and τ is the time delay on the target response. The cost function is minimized with respect to the parameters of the filter (e.g., coefficients $b_2$, $b_1$, $b_0$, and $a_4$ through $a_0$) and the time delay τ. FIG. 6E shows an example of a target overall response function $H_{RRC}$(f), which is a square-root raised cosine function. The function $H_{FRC}$(f) can be determined by a parameter $\alpha_k$ along with the baud rate frequency 1/$T_k$ (which is the baud rate $B_k$ for transmitter 212-k). The parameter $\alpha_k$ is the excess bandwidth of the target function $H_{RRC}$(f). In some embodiments, $\alpha_k$ can be set to 0. In some embodiments of the invention, $\alpha_k$ can be set to 0.6.

The weight function W(f) can be chosen such that the stop band rejection of $H_{TX}$(s) is less than about −50 dB. Initially, W(f) can be chosen to be unity in the pass band frequency 0<f<(1+$\gamma_k$)/2$T_k$ and zero in the stop band frequency f>(1+$\gamma_k$)/2$T_k$, where $\gamma_k$ is the excess bandwidth factor of the kth channel. The minimization of the cost function of Equation 3 can be continued further by increasing W(f) in the stop band until the rejection of analog filters 408 and 409 is less than −50 dB.

In some embodiments, the overall impulse response of the transmit signal is a convolution of the impulse response of DACs 406 and 407 and the impulse response of transmit analog filters 408 and 409, i.e.

$$h_k^{Tx}(t) = h_k^f(t) \oplus h_k^{DAC}(t), \quad (5)$$

where $h_k^f(t)$ is the response of the filter and $h_k^{DAC}(t)$ is the response of DACs 406 and 407. In some embodiments, the DAC response $h_k^{DAC}(t)$ is a sinc function in the frequency domain and a rectangular pulse in the time domain. As shown in Equation 5, the overall response is a convolution of filters 408 and 409 with the response of DACs 406 and 407. The overall filter response can be close to the target response $H_{RRC}(f)$ when $h_k^{TX}(t)$ is determined with the cost function of Equation 3.

The output signals from low-pass filters 408 and 409, designated $I_k^{LPF}(t)$ and $Q_k^{LPF}(t)$, respectively, are then up-converted to a center frequency $f_k$ to generate the output signal of $y_k(t)$, the kth channel signal. The output signal from low-pass filter 408, $I_k^{LPF}(t)$, is multiplied by $\cos(2\pi f_k t)$ in multiplier 410. The output signal from low-pass filter 409, $Q_k^{LPF}(t)$, is multiplied by $\sin(2\pi f_k t)$ in multiplier 411. The signal $\sin(2\pi f_k t)$ can be generated by PLL 414 based on the reference clock signal and the signal $\cos(2\pi f_k t)$ can be generated by a $\pi/2$ phase shifter 413.

However, since mixers 410 and 411 are typically not ideal mixers and the harmonic sine wave input to mixer 410, and the resulting cosine wave input to mixer 411, often varies from a sine wave, signals having harmonics of the frequency $f_k$ are also produced. Often, the harmonic signals input to mixers 410 and 411 may more closely resemble square-wave signals than harmonic sine wave signals. Even if the "sine wave input" is a true sine wave, the most commonly utilized mixers, such as Gilbert Cells, may act as a band-limited switch, resulting in a harmonic signal with alternating positive and negative voltages with frequency the same as the "sine wave input" signal. Therefore, the output signals from filters 408 and 409 are still multiplied by signals that more closely resemble square waves than sine waves. As a result, signals having frequency $2f_k$, $3f_k$, ... are also produced, as well as signals in the base band ($0f_k$). Although the amplitude of these signals may be attenuated with higher harmonics, they are non-negligible in the output signal. Additionally, even harmonics (i.e., $0f_k$, $2f_k$, $4f_k$ ...) are absent if the duty cycle of the harmonic sine wave input to mixers is 50%. Otherwise, some component of all of the harmonics will be present.

The output signals from multipliers 410 and 411 are summed in summer 412 to form $$y_k(t) = \xi_k^0 I_k^{LPF}(t) - \zeta_k^0 Q_k^{LPF}(t) + \sum_{n>0} (\xi_k^n I_k^{LPF} \cos(2\pi n f_k t) - \zeta_k^n Q_k^{LPF} \sin(2\pi n f_k t)). \quad (6)$$

where $\xi_k^n$ and $\zeta_k^n$ is the contribution of the nth harmonic to $y_k(t)$. If the duty cycle of the harmonic input signals to mixers 410 and 411 is near 50%, the even harmonics are low and the odd harmonics are approximately given by $\xi_k^n = I_k^{LPF}/n$ and $\zeta_k^n = Q_k^{LPF}/n$ for odd n. The overall output of transmitter 210-p (FIG. 2B), the output from summer 213, is then given by $$z(t) = \sum_{k=1}^{K} y_k(t). \quad (7)$$

In an example where the frequencies $f_1$ through $f_K$ are given by frequencies $f_0$ through $(Kf_0)$, respectively, then, the overall output signal $z(t)$ is given by:

$$z(t) = \sum_{k=1}^{K} (\xi_k^0 I_k^{LPF}(t) - \zeta_k^0 Q_k^{LPF}) + \quad (8)$$

$$\xi_1^1 I_1^{LPF}(t) \cos\omega_0 t - \zeta_1^1 Q_1^{LPF}(t) \sin\omega_0 t +$$

$$(\xi_1^2 I_1^{LPF}(t) + \xi_2^1 I_2^{LPF}(t)) \cos 2\omega_0 t - (\zeta_1^2 Q_1^{LPF}(t) +$$

$$\zeta_2^1 Q_2^{LPF}(t)) \sin 2\omega_0 t + (\xi_1^3 I_1^{LPF}(t) + \xi_3^1 I_3^{LPF}(t)) \cos 3\omega_0 t -$$

$$(\zeta_1^3 Q_1^{LPF}(t) + \zeta_3^1 Q_3^{LPF}(t)) \sin 3\omega_0 t + (\xi_1^4 I_1^{LPF}(t) +$$

$$\xi_2^2 I_2^{LPF}(t) + \xi_4^1 I_4^{LPF}(t)) \cos 4\omega_0 t - (\zeta_1^4 Q_1^{LPF}(t) +$$

$$\zeta_2^2 Q_2^{LPF}(t) + \zeta_4^1 Q_4^{LPF}(t)) \cos 4\omega_0 t + \cdots$$

$$= \sum_{k=1}^{K} (\xi_k^0 I_k^{LPF}(t) - \zeta_k^0 Q_k^{LPF}(t)) +$$

$$\sum_{M=1}^{\infty} \sum_{\forall k, n \in k*n = M} (\xi_k^n I_k^{LPF}(t) \cos M\omega_0 t - \zeta_k^n Q_k^{LPF}(t) \sin M\omega_0 t)$$

where $\omega_0$ is $2\pi f_0$ and where $I_k^{LPF}(t)$ and $Q_k^{LPF}(t)$ are 0 for all k>K.

As shown in Equation 8, the signal on channel one is replicated into all of the K channels, the baseband, and into harmonic frequencies beyond the base band and the K channels. The signal on channel two, for example, is also transmitted on channels 4, 6, 8, ..., and the baseband. The signal on channel 3 is transmitted on channels 6, 9, 12, ... and the base band. In general, the signal on channel k will be mixed into channels $2k$, $3k$, ... and the baseband. Further, the attenuation of the signals with higher harmonics in some systems can be such that the signal from channel k is non negligible for a large number of harmonics, potentially up to the bandwidth of the process, which can be 30-40 GHz.

In some embodiments of the invention, a high pass filter 215 (see FIG. 2B) receives the signal from summer 213. High pass filter 215 can, for example, be a first-order high-pass filter with 3 dB attenuation at $f_1/2$. Filter 215 removes the DC harmonics, i.e. the baseband transmissions, from the transmitter. In embodiments with a separate baseband transmission, then, cross-channel coupling into the baseband is minimized or eliminated. Further, removing the baseband harmonics from the transmitted signals simplifies cross-channel cancellation at receiver 220-p. In embodiments where high pass filter 215 exists, the first term of Equation 8, $$\sum_{k=1}^{K} (\xi_k^0 I_k^{LPF}(t) - \zeta_k^0 Q_k^{LPF}(t)),$$

is filtered out and becomes close to 0. The output signal from transmitter 210-p then becomes $$z'(t) = \sum_{M=1}^{\infty} \sum_{\forall k, n \in k*n = M} (\xi_k^n I_k^{LPF}(t) \cos M\omega_0 t - \zeta_k^n Q_k^{LPF}(t) \sin M\omega_0 t). \quad (9)$$

In some embodiments, $B_k$ and $\gamma_k$ can be the same for all channels and the center frequencies of channels 301-1 through 301-K, frequencies $f_1$ through $f_K$, respectively, can be chosen by $$f_k = B_k k(1+\gamma_k); 1 \leq k \leq K. \quad (10)$$

In some embodiments, other center frequencies can be chosen, for example:

$$f_1 \geq 0.5 B_k(1+\beta_k)$$

$$(f_k - f_{k-1}) \geq B_k(1+\gamma_k); k \geq 2 \quad (11)$$

The parameter $\gamma_k$ is the excess bandwidth factor. The bandwidth of the k-th channel, then, is $(1+\gamma_k)B_k$. In general, the center frequencies of channels 301-1 through 301-K can be any separated set of frequencies which substantially separate (i.e., minimizing overlap between channels) in frequency the transmission bands of transmission channels 301-1 through 301-K.

In many embodiments, however, the frequencies $f_1$ through $f_K$ are chosen as multiplies of a single frequency $f_0$ which can fulfill equations 10 and/or 11 and results in the harmonic mixing of channels as shown in Equation 8 and 9.

In some embodiments of the invention, DACs 406 and 407 may be moved to receive the output of summer 412. Further, in some embodiments DACs 406 and 407 can be replaced by a single DAC to receive the output of summer 213. However, such DACs should have very high sampling rates. One advantage of utilizing high-sampling rate DACs is that ideal mixing could take place and the number of harmonics that need to be cancelled can be greatly reduced or even eliminated.

As an example, then, an embodiment of transmitter 210-p capable of 10 Gbps transmission can be formed. In that case, $\eta=10$, i.e., an overall throughput of 10 Gbps from the transmitter to the receiver. Some embodiments, for example, can have K=8 channels 301-1 through 301-8, with the baud rate on each channel $B_k$ being 1.25 GHz/6 or about 208.333 Msymbols/sec in a 6/7 trellis encoding. In other words, $n_k=6; 1 \leq k \leq 8$ and encoder 402 is a 6/7 rate trellis encoder. In some embodiments, K=16 (indicating channels 301-1 through 301-16), with baud rate on each channel $B_k$ being 625 MHz/6=104.1667 Msymbols/sec. Therefore, symbol mapper 403 can be a QAM symbol mapper with a 128-symbol constellation with baud rate $B_k$. The baud rate $B_k$, then, can be the same on all sub-channels 301-1 through 301-K. DACs 406 and 407 can have any resolution, limited only by the number of bits required to represent the symbol values output from symbol mapper 403. The center frequencies of the channels of transmitters 212-1 through 212-K, corresponding to channels 301-1 through 301-K, can be given by multiples of $f_0=1.5 B_k$ consistently with Equation 10. For the examples discussed above, then, $f_0$ is 312.5 MHz or 156.25 MHz, depending on $B_k$.

In some embodiments, DACs 406 and 407 are each 4 bit DACs. A schematic diagram of an embodiment of trellis encoder 402 and an embodiment of the resultant 128-QAM constellation mapping are shown in FIGS. 6A, 6B, and 6C, respectively. An example of a 128 symbol QAM mapping table is shown as Table I. The above described trellis encoder 402, in this embodiment, provides an asymptotic coding gain of about 6 dB over uncoded 128-QAM modulation with the same data rate, see, e.g., G. Ungerboeck., "Trellis Coding Modulation with Redundant Signal Sets, Part I. Introduction," IEEE Communications Magazine, vol. 25, no. 2, February 1987, pp. 5-11, and G. Ungerboeck., "Trellis Coding Modulation with Redundant Signal Sets, Part II. State of the Art," IEEE Communications Magazine, vol. 25, no. 2, February 1987, pp. 12-21.

Figure 5B:
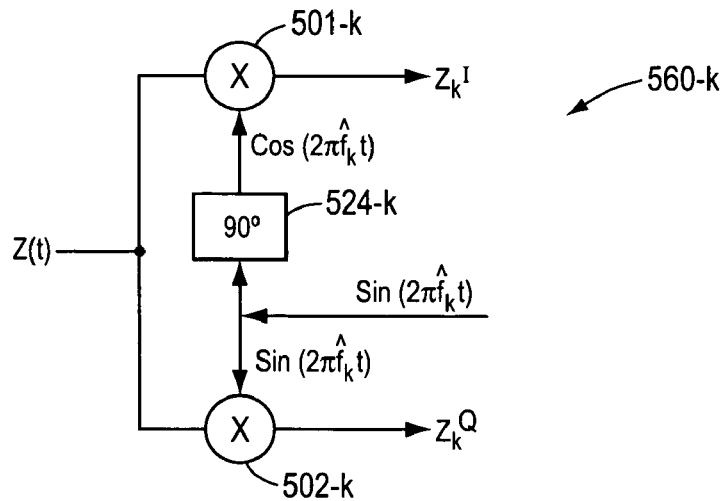
FIG. 5B shows a block diagram of a down-conversion module of a receiver as shown in FIG. 5A.

FIG. 5A shows an example of one of receiver systems 220-p where receiver system 220-p is an arbitrary one of receiver systems 220-1 through 220-P of system 200. Receiver system 220-p includes receivers 221-1 through 221-K to form a K-channel receiver. As shown in FIG. 2C, the output signals from receiver input buffer 224, Z(t), is received in each of receivers 222-1 through 222-K. The signal Z(t), then, is the transmitted signal z(t) after transmission through medium 250. As shown in FIG. 3, the attenuation of signals at each of the K carrier frequencies after transmission through medium 250 can be different. Additionally, the signal Z(t) suffers from inter-symbol interference caused by the dispersive effects of medium 250. The dispersive effects cause the signals received within a particular timing cycle to be mixed with those signals at that carrier frequency received at previous timing cycles. Therefore, in addition to cross-channel interference effects caused by the harmonic generation in mixers of the transmitter (an arbitrary one of which being designated transmitter 210-p), but also the signals for each channel are temporally mixed through dispersion effects in medium 250.

Signal Z(t) is then received into each of receivers 222-1 through 222-K. As shown in FIG. 5A, receiver 222-k, an arbitrary one of receivers 222-1 through 222-K, for example, receives the signal Z(t) into down converter 560-k which, in the embodiment shown in FIG. 5A, down converts the channel transmitted at frequency $f_k$ back into the base-band and recovers in-phase and quadrature components $Z_k^I$ and $Z_k^Q$, respectively.

FIG. 5A shows an embodiment of down-converter 560-k. Signal Z(t) is received in multipliers 501-k and 502-k where it is down-converted to baseband to obtain an in-phase component $Z_k^I(t)$ and a quadrature component $Z_k^Q(t)$. Multiplier 501-k multiplies signal Z(t) with $\cos(2\pi \hat{f}_k t)$ and multiplier 502-k multiplies signal Z(t) with $\sin(2\pi \hat{f}_k t)$, where $\hat{f}_k$ can be the locally generated estimate of the carrier center frequency $f_k$ from the corresponding transmitter. The clock signals within component 201-p, an arbitrary one of components 201-1 through 201-P, which are generated based on the reference signal from PLL 230 as shown in FIG. 2A, will have the same frequencies. However, the frequencies between differing ones of components 201-1 through 201-P can be slightly different. Therefore, $\{f_k\}$ denotes the set of frequencies at the transmitter and $\{\hat{f}_k\}$ denotes the set of frequencies at the receiver.

In some embodiments, component 201-p is a slave component where the frequencies $\{\hat{f}_k\}$ can be adjusted to match those of the component that includes the transmitter, which is also one of components 201-1 through 201-P. In some embodiments, component 201-p is a master component, in which case the transmitter of the component communicating with component 201-p adjusts frequencies $\{f_k\}$ to match those of $\{\hat{f}_k\}$. Arbitration in any given communication link between receiver 220-p of component 201-p and a transmitter in one of the other of components 201-1 through 201-P can be accomplished in several ways. In some embodiments, priority may be set between pairs of components 201-1 through 201-P so that the master/slave relationship between those pairs is pre-determined. In some embodiments, an overall system control chooses at the start of each communication which component is master and which is slave. In some embodiments, the two components may negotiate, for example by each randomly choosing one of the k channels on which to transmit and designating the one that transmits on the lowest numbered channel as master. In any event, in any transmission either the transmitter adjusts $\{f_k\}$ or the receiver adjusts $\{\hat{f}_k\}$ depending on which has been designated master and which slave upon start of the communications As shown in FIG. 5A, PLL 523 generates the clock signals for each of receivers 222-1 through 222-K and, in particular, generates the sin $(2\pi \hat{f}_k t)$ signal for receiver 222-k. The cos $(2\pi \hat{f}_k t)$ signal can be generated by $\pi/2$ phase shifter 524-k. PLL 523 generates the sampling clock signal utilized in analog to digital converters (ADCs) 506-k and 507-k as well as other timing signals utilized in receivers 222-1 through 222-K. PLL 523 also generates an RX CLK signal for output with the $n_k$ bit output signal from receiver 222-k.

Down converters 560-1 through 560-K also generate harmonics for very much the same reasons that harmonics are generated in transmitters 212-1 through 212-K. Therefore, down converter 560-k will down-convert into the base band signals from signals having center frequencies 0, $\hat{f}_k$, 2 $\hat{f}_k$, 3$\hat{f}_k$, . . . . For example, if $\hat{f}_1$ through $\hat{f}_K$ correspond to frequencies $\hat{f}_0$ through $K\hat{f}_0$, then the down conversion process for down converter 560-1 will result in the output signals $Z_1^I$ and $Z_1^Q$ including interference contributions from the received signals from all of the other channels. Additionally, the output signals $Z_2^I$ and $Z_2^Q$ include contributions from channels with frequencies 0, $2f_0$, $4f_0$, $6f_0$ . . . and those channels with harmonics at these frequencies. For example, if a channel has a center frequency at $3f_0$ and transmits a second harmonic at $6f_0$, then the receiver will bring signals at $6f_0$ back to the base-band by the third harmonic of the mixer for the channel at $2f_0$. Therefore, signals from channel k=3 need to be cancelled from signals transmitted on channel k=2. Each of the channels also include the cross-channel interference generated by the transmitter mixers and the dispersive interference created by the channel. If the baseband component of the harmonics is not filtered in filter 215 (FIG. 2B) out between the transmit and receive mixers, then every channel could put a copy of its transmit signal onto the baseband and every channel will receive the baseband signal at the receive side.

PLL 523 can be a free-running loop generating clock signals for receiver 222-k based on a reference clock signal. In some embodiments transmitter 212-k of transmitter and demodulator 222-k of the receiver system 220-p, because they are part of different ones of components 201-1 through 201-P, are at different clock signals. This means that the digital PLLs for timing recovery and carrier recovery correct both phase and frequency offsets between the transmitter clock signals and receiver clock signals. Within one of components 201-1 through 201-P, a transmitter/receiver pair (i.e., transmitter 210-p and receiver 220-p of component 201-p) can operate with the same PLL and therefore will operate with the same clock signals. Components 201-i and 201-j, where i and j refer to different ones of components 201-1 through 201-P, in general may operate at different clock signal frequencies.

Therefore, in some embodiments the signals $Z_k^1$ and $Z_k^Q$ output from down converter 560-k suffer the effects of cross-channel interference resulting from harmonic generation in the transmitter mixers, the effects of cross-channel interference resulting from harmonic generation in the receiver mixers, and the effects of temporal, intersymbol interference, resulting from dispersion in the transport media. As an additional complicating factor, in some embodiments the transmitter and receiver clocks can be different. Therefore, as an example, in embodiments where $f_1$ through $f_K$ of the transmitter correspond to frequencies $f_0$ through $Kf_0$, respectively, then $\hat{f}_1$ through $\hat{f}_K$ of the receiver will correspond to frequencies $(f_0+\Delta)$ through $K(f_0+\Delta)$, where $\Delta$ represents the frequency shift between PLL 523 of receiver 220-p and the PLL of the transmitter component. The transmitter mixers then cause cross-channel interference by mixing the signals transmitted at frequency $f_k$ into $2f_k, 3f_k \ldots (2kf_0, 3kf_0 \ldots$ in one example). The receiver mixers cause cross-channel interference by down-converting the signals received at $\hat{f}_k$, $2\hat{f}_k$, $3 \hat{f}_k$ . . . to the baseband. If the frequencies $\hat{f}_0$ is $f_0+\Delta$, then the harmonics will be down-converted to a base-band shifted in frequency by $k\Delta$, $2k\Delta$, $3k\Delta$ , . . . , respectively.

In some embodiments of the invention, receiver 220-p includes a frequency shift 563 which supplies a reference clock signal to PLL 523. The reference clock signal supplied to PLL 523 can be frequency shifted so that $\Delta$ becomes 0. The frequency supplied to PLL 523 by frequency shift 563 can be digitally created and the input parameters to frequency shift 563 can be adaptively chosen to match the receiver frequency with the transmitter frequency. Embodiments of frequency adjustments in frequency shift 563 and PLL 523 are further discussed below.

Figure 5C:
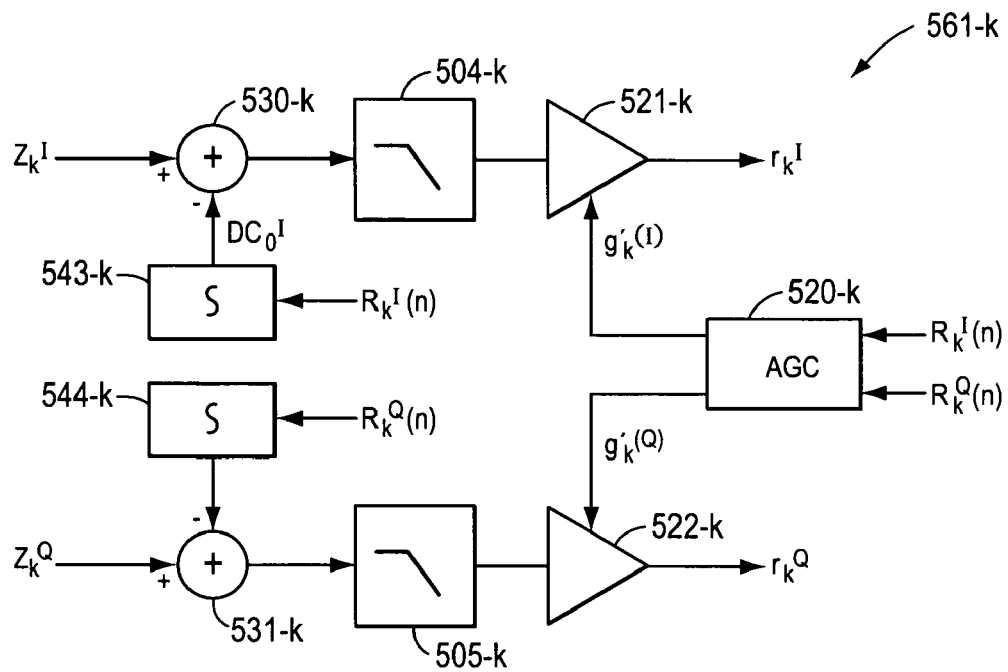
FIG. 5C shows an embodiment of a block diagram of an analog filter of a receiver as shown in FIG. 5A.

As shown in FIG. 5A, the output signals from down-converter 560-k, $Z_k^I$ and $Z_k^Q$, are input to analog filter 561-2. An embodiment of analog filter 561-2 is shown in FIG. 5C. The signals $Z_k^I$ and $Z_k^Q$ are input to offset corrections 530-k and 531-k, respectively. DC offset corrections 530-k and 531-k provide a DC offset for each of the outputs $Z_k^I$ and $Z_k^Q$ from down-converter 560-k to correct for any leakage onto signal Z(t) from the sine and cosine signals provided by PLL 523, plus any DC offset in filters 504-k and 505-k and ADCs 506-k and 507-k. Leakage onto Z(t) can, in some cases, provide a significant DC signal component of the output signals $Z_k^I$ and $Z_k^Q$ from down-converter 560-k. In some embodiments, offsets 530-k and 531-k can offset by the same amount. In some embodiments, different offset values, DCOI and DCOQ in FIG. 5C, can be provided for each of the output signals $Z_k^I$ and $Z_k^Q$ from down-converter 560-k. The DC offset values can be adaptively chosen in blocks 543-k and 544-k. In some embodiments, after an initial start-up procedure, the DC offset values are fixed.

In some embodiments, the DC offsets, DCOI and DCOQ inputs to offsets 530-k and 531-k, respectively, can be generated by providing a low frequency integration of the output signal from analog-to-digital converters (ADCs) 506-k and 507-k (FIG. 5A). In FIG. 5C, for example, low-frequency integrator 543-k receives the output signal from of ADC 506-k, $R_k^I$, and provides the DCOI input signal to offset 530-k; integrator 544-k receives the output signal from ADC 507-k, $R_k^Q$, and provides the DCOQ input signal to offset 531-k. The low frequency integration of integrators 544-k and 543-k provides signals that set the average output signal of each of ADCs 506-k and 507-k to zero. In some embodiments of the invention, integrators 543-k and 544-k hold the offset values DCOI and DCOQ, respectively, constant after a set period time of integration when receiver 222-k is first started.

The output signals $Z_k^I$ and $Z_k^Q$ from down-converter 560-k, or from offsets 530-k and 531-k in embodiments with offsets, can be input to low-pass filters 504-k and 505-k. Low-pass filters 504-k and 505-k are analog filters that filter out signals not associated with the baseband signal (i.e., signals from the remaining bands of transmitter 210-p) for the kth transmission band. Low pass filters 504-k and 505-k, however, do not remove the interference caused by harmonic generation in transmit and receive mixers involved in the up-conversion and down-conversion process.

Filters 504-k and 505-k again, in some embodiments, can be parameterized by the two-zero, five-pole filter design described by Equation 2, $$H_{RX}(s) = \frac{b_2 s^2 + b_1 s + b_0}{s^5 + a_4 s^4 + \cdots + a_0}. \tag{12}$$

Furthermore, the parameters $b_2$, $b_1$, $b_0$, and $a_4$ through $a_0$ can be found by minimizing the cost function $$\int_0^\infty |H_{RX}(s) - H_{RRC}(f) e^{-j2\pi f \tau}|^2 W(f) df. \tag{13}$$

The cost function is minimized with respect to the parameters of the filter and the time delay τ. Again in Equation 13, the weighting function W(f) can be chosen such that the stop band rejection of $H_{RX}(s)$ is less than −50 dB. Furthermore, the function $H_{RRC}(f)$ is the square root raised cosine function shown in FIG. 6E. As shown in FIG. 6E, the function $H_{RRC}(f)$ is characterized by a parameter $\alpha_k$ and baud frequency $1/T_k$. The parameter $\alpha_k$ is the excess bandwidth of the target function $H_{RRC}(f)$. In some embodiments, $\alpha_k$ can be 0. In some embodiments, $\alpha_k$ can be 0.6. In general, the parameter $\alpha_k$ can be any value, with smaller values providing better filtering but larger values being easier to implement. The parameter $T_k$ is related to the baud rate, $T_k = 1/B_k$.

In some embodiments of the invention, filters 504-k and 505-k can be determined by minimizing the function $$\int_0^\infty |H_{DAC}(f) H_{TX}(s) H_{RX}(s) - H_{RC}(f) e^{-j2\pi f \tau}|^2 W(f) df, \tag{14}$$

where the function $H_{RC}(f)$ is a square-root raised cosine function. The function $H_{RC}(f)$ is characterized by the parameters $\alpha_k$ and $1/T_k$. Equation 14 includes the effects of the transmit digital to analog converters 406 and 407 (FIG. 4) as well as the analog transmit filters 408 and 409 (FIG. 4) to set the overall response of filters 408 and 409, filters 504-k and 505-k, and transmitter digital to analog converters 406 and 407 to the target response function $H_{RC}(f)$. In some embodiments, $H_{TX}(f)$ and $H_{RX}(f)$ can be the same.

Figure 8A:
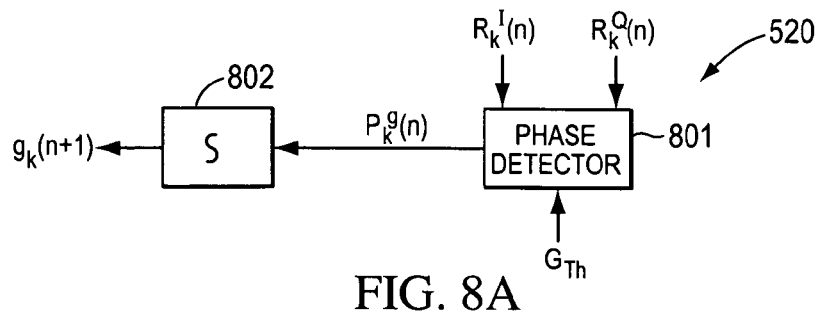
FIGS. 8A and 8B show a block diagram of an embodiment of an automatic gain control circuit of a receiver demodulator according to the present invention.
Figure 8B:
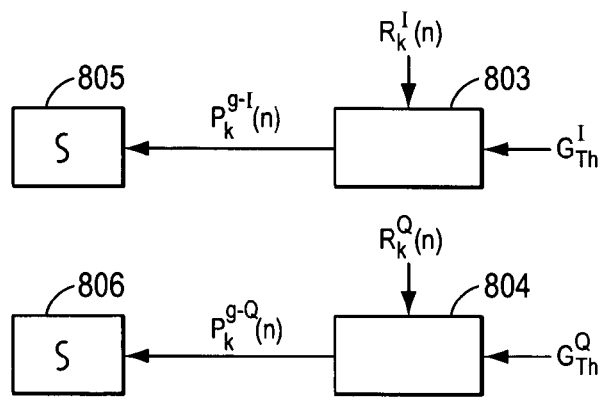

The output signals from low-pass filters 504-k and 505-k can, in some embodiments, be amplified in variable gain amplifiers 521-k and 522-k, respectively. In some embodiments, the gains $g_k^{1(I)}$ and $g_k^{1(Q)}$ of amplifiers 521-k and 522-k, respectively, are set such that the dynamic range of analog-to-digital converters 506-k and 507-k, respectively, is filled. The output signals from amplifiers 521-k and 522-k, then, are $$r_k^I(t) = LPF[Z(t) \cos(2\pi f_k t)] g_k^{1(I)}$$

$$r_k^Q(t) = LPF[Z(t) \sin(2\pi f_k t)] g_k^{1(Q)}, \tag{15}$$

where $g_k^{1(I)}$ and $g_k^{1(Q)}$ represents the gain of amplifiers 521-k and 522-k, respectively. The gains of amplifiers 521-k and 522-k can be set in an automatic gain control circuit (AGC) 520-k. An embodiment of automatic gain circuit 520-k where $g_k^{1(I)}$ and $g_k^{1(Q)}$ are set equal to one another is shown in FIGS. 8A and 8B. In some embodiments, amplifiers 521-k and 522-k can be before or incorporated within filters 504-k and 505-k, respectively.

As shown in FIG. 5A, the signals output from analog filter 561-k, signals $r_k^I(t)$ and $r_k^Q(t)$, are input to analog-to-digital converters (ADC) 506-k and 507-k, respectively, which forms digitized signals $R_k^I(t)$ and $R_k^Q(t)$ corresponding with the analog signals $r_k^I(t)$ and $r_k^Q(t)$, respectively. In some embodiments, ADCs 506-k and 507-k operate at a sampling rate that is the same as the transmission symbol rate, e.g. the QAM symbol rate. In some embodiments, ADCs 506-k and 507-k can operate at higher rates, for example twice the QAM symbol rate. The timing clock signal SCLK, as well as the sine and cosine functions of Equation 15, is determined by PLL 523. In outputs with η=10, K=8, and $n_k$=6, as described above, ADCs 506-k and 507-k can operate at a rate of about 208 Msymbols/sec or, in embodiments with K=16, about 104 Msymbols/sec. In some embodiments, ADCs 506-k and 507-k can be 8-bit ADCs. However, for 128 QAM operation, anything more than 7 bits can be utilized.

In some embodiments, the gain of amplifiers 521-k and 522-k of analog filters 560-k can be set by automatic gain control circuit (AGC) 520-k (see FIG. 5C). Gain control circuit 520-k can receive the digital output signals from ADCs 506-k and 507-k, $R_k^I(n)$ and $R_k^Q(n)$, respectively, and determines the gain $g_k^1(n+1)$ for each of amplifiers 521-k and 522-k (i.e., in this embodiment $g_k^{1(I)}(n)$ and $g_k^{1(Q)}(n)$ are equal). FIGS. 8A and 8B show some embodiments of AGC 520-k. The embodiment of AGC 520-k shown in FIG. 8A includes an AGC phase detector 801 and an integrator 802. Phase detector 801 estimates whether or not the mean-squared-power of signals $R_k^I(t)$ and $R_k^Q(t)$ are at a predetermined threshold value and, if not, provides a correction signal to adjust the amplitudes of signals $r_k^I(t)$ and $r_k^Q(t)$. The output signal from phase detector 801 can be given by $$P_k^g(n) = [G_{th} - (R_k^I(n)^2 + R_k^Q(n)^2)], \tag{16}$$

where $G_{th}$ is the mean squared power of the signals input to ADCs 506-k and 507-k once AGC 520-k converges. The output signal from phase detector 801, $p_k^g(n)$, is then input to integrator 802. Integrator 802 digitally adjusts the gain $g_k$ according to $$g_k^1(n+1) = g_k^1(n) + \alpha_g P_k^g(n), \tag{17}$$

where $\alpha_g$ determines the rate of adaptation of the AGC algorithm. The constant $\alpha_g$ can be chosen to be a negative power of 2 for ease of implementation.

The embodiment of phase detector 520-k shown in FIG. 8B includes two phase detectors 803 and 804 which calculate the mean squared powers of $R_k^I(n)$ and $R_k^Q(n)$ separately and compare them with thresholds $G_{th}^I$ and $G_{th}^Q$ respectively. The output signals from phase detectors 803 and 804 can be given by $$P_k^{g-I}(n) = [G_{th}^I - (R_k^I(n)^2)]$$

$$P_k^{g-Q}(n) = [G_{th}^Q - (R_k^Q(n)^2)], \tag{18}$$

respectively. The output signals from detectors 803 and 804 can then be integrated in integrators 805 and 806 according to $$g_k^{1-I}(n+1) = g_k^{1-I}(n) + \alpha_g^I p_k^{g-I}(n), \text{ and}$$

$$g_k^{1-Q}(n+1) = g_k^{1-Q}(n) + \alpha_g^Q p_k^{g-Q}(n), \tag{19}$$

where $\alpha_g^I$ and $\alpha_g^Q$ determine the rate of adaptation of the AGC algorithm as in Equation 17 above.

In some embodiments AGC 520-k can include a peak detection algorithm so that the gain values $g_k^{1(I) \text{ and } g_k^{1(Q)}}$ are determined from the peak values of $R_k^I$ and $R_k^Q$, respectively. Again, the peak values of $R_k^I$ and $R_k^Q$ can be compared with threshold values and the gain values $g_k^{1(I)}$ and $g^{k1(Q)}$ adjusted accordingly.

Figure 5D:
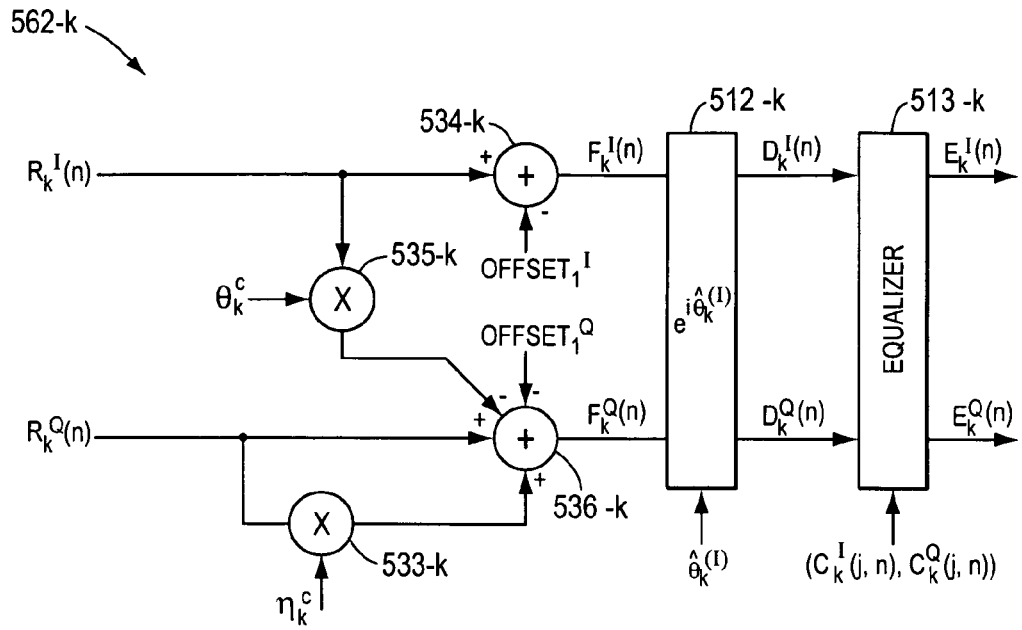
FIG. 5D shows an embodiment of a digital filter of a receiver as shown in FIG. 5A.

As shown in FIG. 5A, the output signals from ADCs 506-k and 507-k, $R_k^I$ and $R_k^Q$, respectively, are input to a first digital filter 562-k. An embodiment of first digital filter 562-k is shown in FIG. 5D. In some embodiments of the invention, the in-phase and quadrature data paths may suffer from small differences in phase and small differences in gain. Therefore, in some embodiments a phase and amplitude correction is included in digital filter 562-k. In order to correct the phase and amplitude between the in-phase and quadrature data paths, one of the values $R_k^I(n)$ and $R_k^Q(n)$ is assumed to be of the correct phase and amplitude. The opposite value is then corrected. In the embodiment shown in FIG. 5D, $R_k^I(n)$ is assumed to be correct and $R_k^Q(n)$ is corrected. The phase error can be corrected by using the approximation for small $\theta_k^c$ where $\sin\theta_k^c$ is approximately $\theta_k^c$, and $\cos\theta_k^c$ is approximately one. This correction can be implemented by subtracting in summer 536-k the value $\theta_k^c R_k^I(n)$ calculated in multiplier 535-k to $R_k^Q(n)$. The amplitude of $R_k^Q(n)$ can be corrected by adding a small portion $\eta_k^c$ of $R_k^Q(n)$, calculated in multiplier 533-k, in summer 536-k. The value $\eta_k^c$ can be determined in tracking and recovery block 517-k by integrating the difference in magnitude of the output signals from summer 534-k and 536-k, $F_k^I(n)$ and $F_k^Q(n)$, in a very low frequency integration block (for example several kHz), such that $$\eta_k^c = \int (|F_k^I(n)| - |F_k^Q(n)|)dn. \quad (20)$$

The value $\theta_k^c$ can be chosen in tracking and recovery block 517-k by $$\theta_k^c = \int (\text{sign}(F_k^I(n))F_k^Q(n) + \text{sign}(F_k^Q(n))F_k^I(n))dn. \quad (21)$$

Additionally, an arithmetic offset can be implemented by subtracting the value $\text{OFFSET}_1^I$ in summer 534-k to $R_k^I(n)$ and subtracting the value $\text{OFFSET}_1^Q$ in summer 536-k. The offset values $\text{OFFSET}_1^I$ and $\text{OFFSET}_1^Q$ can be adaptively chosen in tracking and recovery block 517-k by integrating the output signals from summer 534-k and summer 536-k, $F_k^I(n)$ and $F_k^Q(n)$, respectively, in a low frequency integration. The offsets implemented in summer 534-k and 536-k offset the dc offset not corrected in analog filter 561-k, e.g. by offsets 530-k and 531-k, for example, as well as arithmetic errors in summers 534-k, 536-k and multipliers 535-k and 533-k.

The output signals from summers 534-k and 536-k, then, can be given by $$F_k^I(n) = R_k^I(n) - \text{OFFSET}_{1,K}^I, \text{ and}$$

$$F_k^Q(n) = (1+\eta_k^c)R_k^Q(n) - \theta_k^c R_k^I(n) - \text{OFFSET}_{1,k}^Q. \quad (22)$$

In some embodiments, the parameters $\text{OFFSET}_{1,k}^I$, $\text{OFFSET}_{1,k}^Q$, $\eta_k^c$, and $\theta_k^c$ vary for each cycle n. Additionally, the parameters can be different for each of the k receivers 222-1 through 222-k.

The output signals from summers 534-k and 536-k, $F_k^I(n)$ and $F_k^Q(n)$, respectively, are then input to a phase rotation circuit 512-k. Phase rotation 512-k rotates signals $F_k^I(n)$ and $F_k^Q(n)$ according to the output of a carrier phase and frequency offset correction circuit, which depends on the difference between $f_k$ and $\hat{f}_k$, and the relative phase of the transmit mixers (multipliers 410 and 411) and the receive mixers (multipliers 501-k and 502-k) and transmission channel 250 (FIG. 2A). The rotation angle $\hat{\theta}_k^I(n)$ is computed in carrier tracking and timing recovery block 517. The resultant output signals of carrier phase rotation circuit 512, $D_k^I(n)$ and $D_k^Q(n)$, can be given by:

$$D_k^I(n) = F_k^I(n)\cos(\hat{\theta}_k^I(n)) + F_k^Q(n)\sin(\hat{\theta}_k^I(n))$$

$$D_k^Q(n) = F_k^Q(n)\cos(\hat{\theta}_k^I(n)) - F_k^I(n)\sin(\hat{\theta}_k^I(n)). \quad (23)$$

The output signals from rotation circuit 512-k, $D_k^I(n)$ and $D_k^Q(n)$, are then input to a complex adaptive equalizer 513-k to counter the intersymbol interference caused by frequency dependent channel attenuation, and the reflections due to connectors and vias that exist in communication system 200 (which can be a backplane communication system, an inter-cabinet communication system, or a chip-to-chip communication system) and both transmit and receive low pass filters, e.g. filters 408 and 409 of FIG. 4 and filters 504-k and 505-k of FIG. 5C.

It should be noted that because of the frequency division multiplexing of data signals, as is accomplished in transmitter system 210-p and receiver system 220-p, the amount of equalization needed in any one of channels 301-1 through 301-K is minimal. In some embodiments, such as the 16-channel, 6 bit per channel, 10 Gbps example, only about 1-2 dB of transmission channel magnitude distortion needs to be equalized. In 8 channel embodiments, 3-4 dB of distortion needs to be equalized. In other words, the number of taps required in a transport function for equalizer 513-k can be minimal (e.g., 1-4 complex taps) in embodiments of the present invention, which can simplify receiver 220-p considerably. In some embodiments of the invention, equalizer 513 can have any number of taps.

Complex Equalizer 513-k can be either a linear equalizer (i.e., having a feed-forward section only) or a decision feed-back equalizer (i.e., having a feed-forward and a feed-back portion). The coefficients of the equalizer transfer function are complex-valued and can be adaptive. In some embodiments, the complex equalizer coefficients that operate on signals $D_k^I$ and $D_k^Q$ are the same, but in other embodiments the complex equalizer coefficients are allowed to be different for $D_k^I$ and $D_k^Q$.

Additionally, the feed-forward portion of an adaptive equalizer (either a linear equalizer or decision feed-back equalizer) can be preceded by a non-adaptive all-pole filter with transfer function $1/A(z)$. In some embodiments, the coefficients of $A(z)$, which can be found by a minimum mean squared error technique, can be real-valued, for example $$A(Z) = 1.0 + 0.75Z^{-1} + 0.0625Z^{-2} + 0.0234375Z^{-3} + 0.09375Z^{-4}, \quad (24)$$

which can be rewritten as $$A(Z) = 1 + 0.75Z^{-1} + \frac{1}{16}Z^{-2} + \left(\frac{1}{64} + \frac{1}{128}\right)Z^{-3} + \left(\frac{1}{16} + \frac{1}{32}\right)Z^{-4}. \quad (25)$$

The resulting transfer function $H(z) = 1/A(z)$ can be implemented in a linear equalizer or a decision feedback equalizer. In some embodiments, however, complex adaptive equalizer 513-k includes adaptively chosen parameters.

In general, complex adaptive equalizer 513-k can be a decision feedback equalizer (DFE) or a linear equalizer. See, e.g., EDWARD A. LEE, AND DAVID G. MESSERSCHMITT, DIGITAL COMMUNICATION, pp. 371–402 (Kluwer Academic Publishers, 1988). The in-phase and quadrature output signals from adaptive equalizer 513 in embodiments with linear equalization can be given by:

$$E_k^I(n) = \sum_{j=-M}^{N} C_k^{x,I}(j,n) D_k^I(n-j) - C_k^{y,I}(j,n) D_k^Q(n-j) \text{ and} \quad (26)$$

$$E_k^Q(n) = \sum_{j=-M}^{N} C_k^{x,Q}(j,n) D_k^Q(n-j) + C_k^{y,Q}(j,n) D_k^I(n-j).$$

where j refers to the tap $Z^{-j}$. The complex adaptive equalizer coefficients $C_k^{x,I}(j,n)$, $C_k^{y,I}(j,n)$, $C_k^{x,Q}(j,n)$ and $C_k^{y,Q}(j,n)$ can be updated according to the least mean squares (LMS) algorithm as described in BERNARD SKLAR, DIGITAL COMMUNICATIONS, FUNDAMENTALS AND APPLICATIONS (Prentice-Hall, Inc., 1988), for example. In some embodiments, equalizer coefficients $C_k^{x,I}(j,n)$ and $C_k^{x,Q}(j,n)$ are the same and equalizer coefficients $C_k^{y,I}(j,n)$ and $C_k^{y,Q}(j,n)$ are the same.

In some embodiments of the invention, the center coefficients of the feed-forward part of equalizer 513-k, $C_k^{x,I}(0,n)$, $C_k^{y,I}(0,n)$, $C_k^{x,Q}(0,n)$ and $C_k^{y,Q}(0,n)$ can each be fixed at 1 and 0, respectively, to avoid interaction with the adaptation of gain coefficients $g_k^{2(I)}$ and $g_k^{2(Q)}$ used in amplifiers 537-k and 538-k of a second digital filter 563-k and the carrier phase correction performed in phase rotator 512-k. Additionally, in some embodiments the coefficients $C_k^{x,I}(-1,n)$, $C_k^{y,I}(-1,n)$, $C_k^{x,Q}(-1,n)$ and $C_k^{y,Q}(-1,n)$ can be fixed at constant values to avoid interaction with the adaptation of the phase parameter $\hat{\tau}_k$ by tracking and timing recovery 517-k. For example, the parameters $C_k^{x,I}(-1,n)$ and $C_k^{x,Q}(-1,n)$ can be $-\frac{1}{4}-\frac{1}{16}$, which is $-0.3125$, and the parameters $C_k^{y,Q}(-1,n)$ and $C_k^{y,Q}(-1,n)$ can be $-\frac{1}{64}$, which is $-0.015625$. In some embodiments, one set of parameters, for example $C_k^{x,I}(-1,n)$ and $C_k^{x,Q}(-1,n)$ are fixed while the other set of parameters, for example $C_k^{y,I}(-1,n)$ and $C_k^{y,Q}(-1,n)$, can be adaptively chosen.

Figure 7:
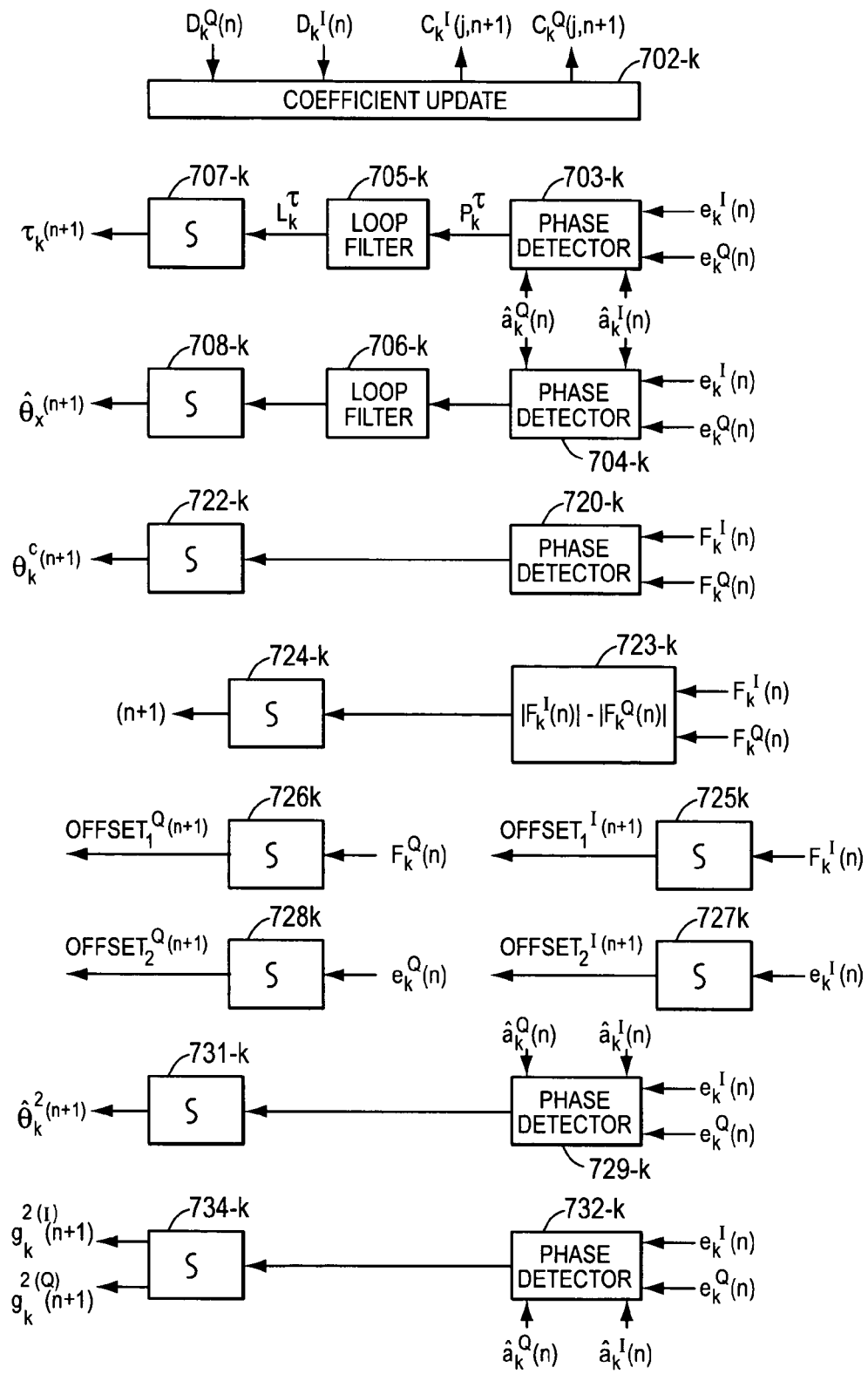
FIG. 7 shows a block diagram of an embodiment of a tracking and error-recovery circuit of the receiver shown in FIG. 5A.

In some embodiments of the invention, for example, $C_k^{x,I}(-1,n)$ and $C_k^{y,I}(-1,n)$ are fixed and the timing recover loop of adaptive parameters 517-2 for determining the phase parameter $\hat{\tau}_k$ utilizes errors $e_k^I$ only (see FIG. 7). In that way, adaptively choosing parameters in the Q channel do not interact with the timing loop. In some embodiments, the opposite can be utilized (i.e., $C_k^{x,Q}(-1,n)$ and $C_k^{y,Q}(-1,n)$ are fixed and the timing loop determines the phase parameter $\hat{\tau}_k$ from error parameter $e_k^Q$.

The output signals from each of digital filters 562-1 through 562-K, signals $E_1^I(n)$ and $E_1^{Q(n)}$ through $E_K^I(n)$ and $E_K^Q(n)$, respectively, are input to cross-channel interference filter 570. Cross-channel interference canceller 570 removes the effects of cross-channel interference. Cross-channel interference can result, for example, from harmonic generation in the transmitter and receiver mixers, as has been previously discussed. As described in the embodiment of digital filter 562-k shown in FIG. 5D, equalization for intersymbol interference can be performed in digital filter 562-k. In some embodiments of the invention, cross-channel interference filter 570 may be placed before equalizer 513-k (in other words, equalizer 513-k may be placed in digital filter 563-2 instead of digital filter 562-2).

The output signals from digital filter 562-2, $E_k^I(n)$ and $E_k^Q(n)$, for each of receivers 222-1 through 222-K are input to cross-channel interference filter 570. An embodiment of cross-channel interference canceller 570 is shown in FIG. 5F. For convenience of discussion, the input signals $E_k^I(n)$ and $E_k^Q(n)$ are combined into a complex value $E_k(n)=E_k^I(n)+iE_k^Q(n)$ (where i is $\sqrt{-1}$). Each of the complex values $E_1$ through $E_K$ is input to a summer 571-1 through 571-K, respectively, where contributions from all of the other channels are removed. The output signals from summers 571-1 through 571-K, $H_1$ through $H_K$, respectively, are the output signals from cross-channel interference filter 570. Again, the complex value $H_k(n)$ is $H_k^I(n)+iH_k^Q(n)$, representing the in-phase and quadrature output signals.

The signal $E_k$ is also input to blocks 572-k, 1 through 572-k,k–1 and blocks 572-k,k+1 to 572-k,K. Block 572-k,l, an arbitrary one of blocks 572-1,2 through 572-K, K-1, performs a transfer function $Q_{k,l}$ which determines the amount of signal $E_k$ which should be removed from $E_1$ to form $H_l$. Further, delays 573-1 through 573-K delay signals $E_1$ through $E_K$ for a set number of cycles N to center the cancellations in time. Therefore, the output signals $H_1$ through $H_K$ can be determined as $$\begin{pmatrix} H_1 \\ H_2 \\ \vdots \\ H_k \\ \vdots \\ H_K \end{pmatrix} = \begin{pmatrix} Z^{-N} & 0 & \cdots & 0 & \cdots & 0 \\ 0 & Z^{-N} & \cdots & 0 & \cdots & 0 \\ \vdots & \vdots & \ddots & \vdots & \cdots & \vdots \\ 0 & 0 & \cdots & Z^{-N} & \cdots & 0 \\ \vdots & \vdots & \cdots & \vdots & \ddots & \vdots \\ 0 & 0 & \cdots & 0 & \cdots & Z^{-N} \end{pmatrix} \begin{pmatrix} E_1 \\ E_2 \\ \vdots \\ E_k \\ \vdots \\ E_K \end{pmatrix} - \quad (27)$$

$$\begin{pmatrix} 0 & Q_{2,1} & \cdots & Q_{k,1} & \cdots & Q_{K,1} \\ Q_{1,2} & 0 & \cdots & Q_{k,2} & \cdots & Q_{K,2} \\ \vdots & \vdots & \ddots & \vdots & \vdots & \vdots \\ Q_{1,k} & Q_{2,k} & \cdots & 0 & \cdots & Q_{K,k} \\ \vdots & \vdots & \vdots & \vdots & \ddots & \vdots \\ Q_{1,K} & Q_{2,K} & \cdots & Q_{k,K} & \cdots & 0 \end{pmatrix} \begin{pmatrix} E_1 \\ E_2 \\ \vdots \\ E_k \\ \vdots \\ E_K \end{pmatrix},$$

where $Z^{-1}$ represents a once cycle delay. The transfer functions $Q_{k,l}$ can have any number of taps and, in general, can be given by $$Q_{k,l} = \sigma_{k,l}^0 + \sigma_{k,l}^1 Z^{-1} + \sigma_{k,l}^2 Z^{-2} + \ldots + \sigma_{k,l}^M Z^{-M}. \quad (28)$$

In general, each of the functions $Q_{k,l}$ can have a different number of taps M and N can be different for each channel. In some embodiments, the number of taps M for each function $Q_{k,l}$ can be the same. In some embodiments, delays can be added in order to match the timing between all of the channels. Further, in general delays 573-1 through 573-K can delay signals $E_1$ through $E_K$ by a different number of cycles. In some embodiments, where each of functions $Q_{k,l}$ includes M delays, each of delays 573-1 through 573-K includes N=M/2 delays where N is rounded to the nearest integer.

The coefficients $\sigma_{k,l}^0$ through $\sigma_{k,l}^M$ can be adaptively chosen in cross-channel adaptive parameter block 571 as shown in FIG. 5A in order to optimize the performance of receiver system 220-p. In some embodiments, M is chosen to be 5. In some embodiments, transfer function $Q_{k,l}$ may be constants, M=0. Cross-channel adaptive parameter block 571 is further discussed below.

Therefore, in cross channel interference canceller 570 the cross channel interference is subtracted from the output signals from digital filters 562-1 through 562-K as indicated by Equation 26. The output signals from cross-channel interference canceller 570 for an arbitrary one of receivers 222-k, $H_k^I$ and $H_k^Q$, can be input to a second digital filter 563-k. An embodiment of second digital filter 563-k is shown in FIG. 5E.

The parameters $\sigma_{k,l}^m$ of Equation 28 can be adaptively chosen. In the adaptation algorithm, the real and imaginary parts of $\sigma_{k,l}^m$ can be adjusted separately. The adaptive adjustments of parameters a $\sigma_{k,l}^m$ is further discussed below.

Figure 5E:
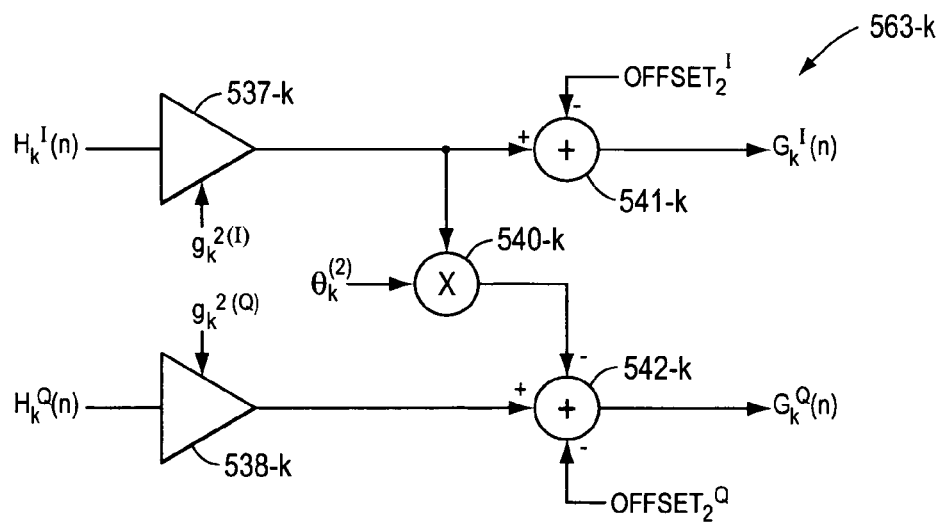
FIG. 5E shows an embodiment of a second digital filter of a receiver as shown in FIG. 5A.
Figure 5F:
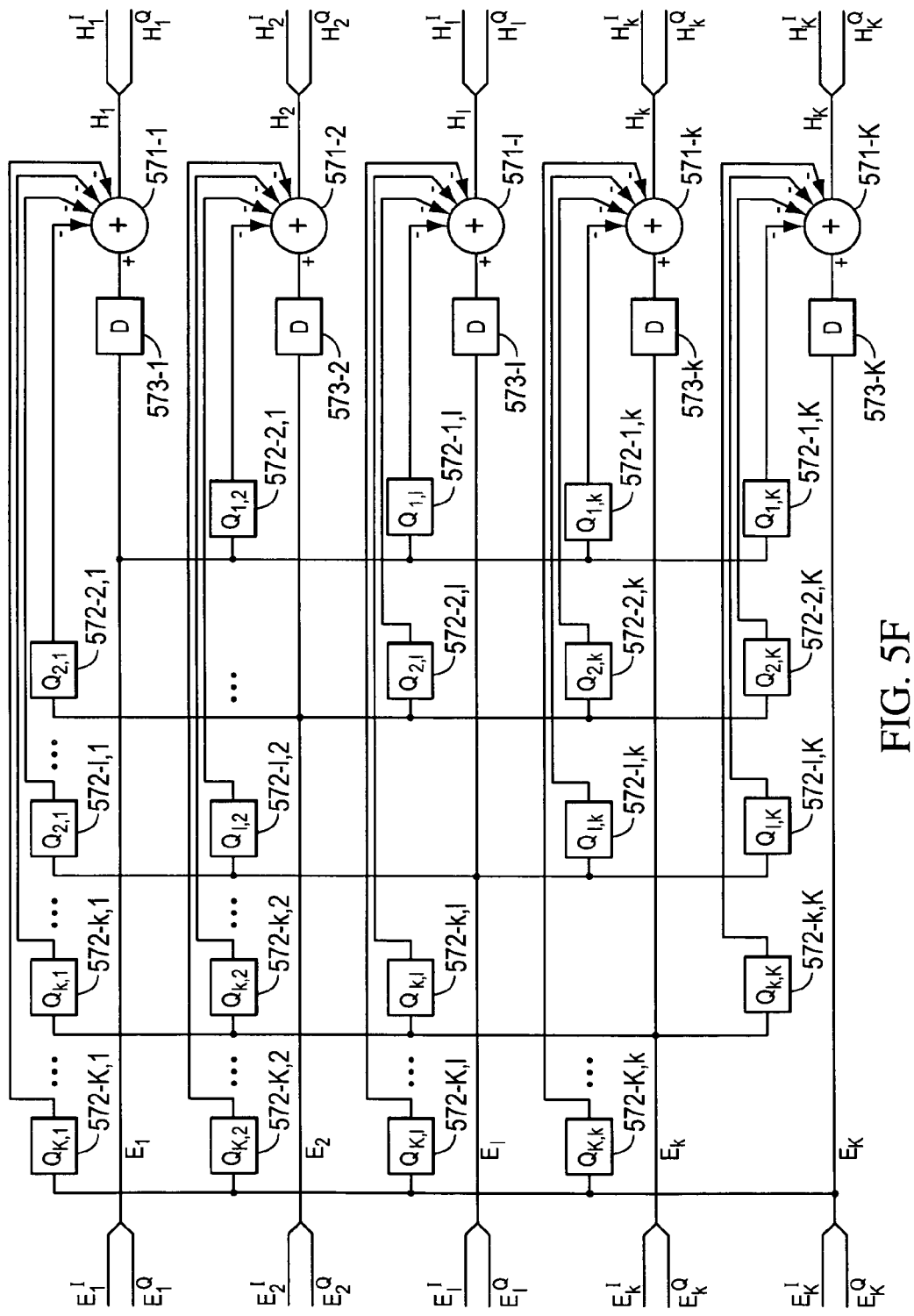
FIG. 5F shows an embodiment of a cross-channel interference canceller of the receiver shown in FIG. 5A in accordance with the present invention.

As shown in FIG. 5E, the signals $H_k^I$ and $H_k^Q$ can be input to AGC controlled amplifiers 537-k and 538-k, respectively. The gains of amplifiers 537-k and 538-k, $g_k^{2(I)}$ and $g_k^{2(Q)}$, respectively, are set such that the output signals from amplifiers 537-k and 538-k yield appropriate levels for the symbol set. The gain values $g_k^{2(I)}$ and $g_k^{2(Q)}$ are set in tracking and timing recovery 517-k and can be determined in much the same fashion as in AGC 520-k of FIG. 5C. In the embodiment shown in FIG. 7, the gain values $g_k^{2(I)}$ and $g_k^{2(Q)}$ are determined based on the sign of the determined symbol from decision unit 516-k and the error signal. These calculations are discussed further below.

The output signals from amplifiers 537-k and 538-k can be input to quadrature correction 540-k. Quadrature correction 540-k corrects for the phase error between the in-phase and quadrature mixers at the transmitter. The angle $\hat{\theta}_k^{(2)}(n)$ of the phase error can be adaptively chosen in tracking and timing recovery 517. The value $\hat{\theta}_k^{(2)}(n)$ can be changed very slowly and can be almost constant.

Additionally, arithmetic offsets $OFFSET_2^I$ and $OFFSET^{2Q}$ can be subtracted in summers 541-k and 542-k, respectively. The values of $OFFSET_2^I$ and $OFFSET_2^Q$ can be adaptively chosen in tracking and timing recovery 517-k. In some embodiments, the $OFFSET_2^I$ and $OFFSET_2^Q$ can be set by integrating the output signals of summers 541-k and 542-k, $G_k^I(n)$ and $G_k^Q(n)$, respectively. Alternatively, as shown in FIG. 7, $OFFSET_2^I$ and $OFFSET_2^Q$ can be set such that the error at decision unit 516-k is zero. In that embodiment, data dependent jitter can be reduced. In some embodiments, tracking and timing recovery 517-k integrates the error values between the output samples from decision unit 516-k and the output signals $G_k^I(n)$ and $G_k^Q(n)$ to minimize the error values.

The output signals $G_k^I(n)$ and $G_k^Q(n)$, then, are given by $$G_k^I(n) = g_k^{2-I} E_k^I(n) - OFFSET_2^I$$

$$G_k^Q(n) = g_k^{2-Q} E_k^Q(n) - g_k^{2-I} E_k^I(n)\hat{\theta}_k^{(2)} - OFFSET_2^Q. \quad (29)$$

FIG. 7 shows an embodiment of Tracking and Timing Recovery 517-k. Tracking and timing recovery 517-k inputs decision values $\hat{a}_k^I(n)$ and $\hat{a}_k^Q(n)$, which are decisions of the symbol values based on the signals $G_k^I(n)$ and $G_k^Q(n)$ in decision unit 516-k, and error values $e_k^I(n)$ and $e_k^Q(n)$ based on the decided values $\hat{a}_k^I(n)$ and $\hat{a}_k^Q(n)$ and the values $G_k^I(n)$ and $G_k^Q(n)$. In some embodiments, the error values $e_k^I(n)$ and $e_k^Q(n)$ are the differences between the decided values $\hat{a}_k^I(n)$ and $\hat{a}_k^Q(n)$ and the values $G_k^I(n)$ and $G_k^Q(n)$. The coefficients of equalizer 513-k of first digital filter 562-k are computed in coefficient update 702-k.

The coefficients of Equalizer 513-k of FIG. 5D are updated in tracking and timing recovery block 517-k. In a multi-top equalizer, for example, equalizer coefficients can be updated according to the following update equations:

$$C_k^x(j,n+1) = C_k^x(j,n) - \mu[e_k^I(n)D_k^I(n-j) + e_k^Q(n)D_k^Q(n-j)]$$

and $$C_k^y(j,n+1) = C_k^y(j,n) - \mu[e_k^Q(n)D_k^I(n-j) - e_k^I(n)D_k^Q(n-j)], \quad (30)$$

where $\mu$ is the constant that determines the rate of adaptation of the coefficients, j indicates the tap of the coefficient, and $e_k^I(n)$ and $e_k^Q(n)$ are estimated error values. The constant $\mu$ is chosen to control the rate of adaptation, and, in some embodiments, is in the range of $2^{-8}$ to $2^{-14}$. In some embodiments, the coefficient $\mu$ can be different for the update equation for $C_k^x$ and the update equation for $C_k^y$. The estimated error values, which are computed by decision block 516-k, can be computed according to:

$$e_k^I(n) = G_k^I(n) - \hat{a}_k^I(n) \text{ and}$$

$$e_k^Q(n) = G_k^Q(n) - \hat{a}_k^Q(n), \quad (31)$$

where $G_k^I(n)$ and $G_k^Q(n)$ are corrected values of $E_k^I(n)$ and $E_k^Q(n)$, respectively, and $\{\hat{a}_k^I(n), \hat{a}_k^Q(n)\}$ is the decision set based on the sample set $\{G_k^I(n), G_k^Q(n)\}$, and represents the closest QAM symbol in Euclidean distance to the sample set. See, e.g., EDWARD A. LEE, AND DAVID G. MESSERSCHMITT, DIGITAL COMMUNICATION, PP. 371-402 (Kluwer Academic Publishers, 1988). A decision set $\{\hat{a}_k^I(n), \hat{a}_k^Q(n)\}$ can be computed based on sample set $\{G_k^I(n), G_k^Q(n)\}$ in decision unit 516-k and the results received into tracking and timing recovery circuit 517 where the estimated error values of Equation 30 and the resulting coefficient updates of Equation 30 are computed.

FIG. 7 shows a block diagram of equalizer coefficient update, carrier tracking and timing recovery block 517-k. Block 517-k includes coefficient update block 702-k. Errors $e_k^I(n)$ and $e_k^Q(n)$ are computed in decision block 516-k according to Equation 30. Coefficient update 702-k receives errors $e_k^I(n)$ and $e_k^Q(n)$ signals $D_k^I(n)$ and $D_k^Q(n)$ from phase rotator circuit 512-k shown in FIG. 5D and calculates updated equalizer coefficients for complex adaptive equalizer 513-k shown in FIG. 5D according to Equation 30.

Tracking and timing recovery circuit 517-k can also include a carrier recovery loop for controlling carrier phase rotation circuit 512-k shown in FIG. 5D and a timing recovery loop for controlling the phase of sampling clock signal SCLK from PLL 523. In some embodiments, the timing recovery loop for determining $\tau_k(n+1)$ in tracking and timing recovery 517 can be implemented as a $2^{nd}$ order digital phase locked loop as shown in FIG. 7.

The errors $e_k^I(n)$ and $e_k^Q(n)$ and the decisions $\hat{a}_k^I(n)$ and $\hat{a}_k^Q(n)$ from decision unit 516-k are input to phase detector 703-k. Phase detector 703-k can produce an estimate of the phase error $p_k^\tau$, in some embodiments according to the following equation:

$$p_k^\tau(n) = [e_k^I(n-1)\hat{a}_k^I(n) - e_k^I(n)\hat{a}_k^I(n-1)] + [e_k^Q(n-1)\hat{a}_k^Q(n) - e_k^Q(n)\hat{a}_k^Q(n-1)]. \quad (32)$$

Alternatively, the phase error $p_k^\tau$ can be calculated from $$p_k^\tau(n) = e_k^I(n-1)[\hat{a}_k^I(n) - \hat{a}_k^I(n-2)] + e_k^Q(n-1)[\hat{a}_k^Q(n) - \hat{a}_k^Q(n-2)], \quad (33)$$

which can be simpler to implement than Equation 32. In embodiments where the phase correction $\hat{\tau}_k$ is calculated from $e_k^I$ only or from $e_k^Q$ only, as discussed above, then the terms containing $e_k^Q$ or the terms containing $e_k^I$, respectively, are dropped from Equations 32 and 33.

The output signal from phase detector 703-k, $p_k^\tau$, can then be input to a $2^{nd}$ order loop filter, which in some embodiments can have a transfer function given by $$L(z) = \alpha_\tau + \beta_\tau \frac{z^{-1}}{1-z^{-1}} \qquad (34)$$

where $\alpha_\tau$ and $\beta_{96}$ are the loop filter coefficients that determine the timing recovery loop bandwidth and damping factor. In some embodiments, a loop bandwidth equal to 1% of baud rate, and damping factor equal to 1 can be implemented. The loop bandwidth and damping factors can depend not only on loop filter coefficients, but also on phase detector slope, and the digital integrator gain. Thus, the output signal $L_k^\tau(n)$ from loop filter 705-k is given by $$L_k^\tau(n) = \alpha_\tau p_k^\tau(n) + I_k^\tau(n), \text{ where}$$

$$I_k^\tau(n) = I_k^\tau(n-1) + \beta_\tau p_k^\tau(n-1). \qquad (35)$$

The output signal from loop filter 705-k, $L_k^\tau(n)$, is then input to a digitally implemented integrator 707-k, the output of which is the phase correction $\hat{\tau}_k(n)$ given by $$\hat{\tau}_k(n+1) = \hat{\tau}_k(n) + L_k^\tau(n). \qquad (36)$$

The phase correction $\hat{\tau}_k(n)$ is then received by PLL 523, as described above.

The carrier phase recovery loop which computes the parameter $\hat{\theta}$ utilized in phase rotation 512-k can also be implemented as a $2^{nd}$ order digital phase locked loop as shown in FIG. 7. Phase detector 704-k receives decision values $\{\hat{a}_k^I(n), \hat{a}_k^Q(n)\}$ and error signals $\{e_k^I(n), e_k^Q(n)\}$ from decision unit 516-k, and produces an estimate of the phase error. In some embodiments, the estimate of the phase error $p_k^\theta(n)$ performed by phase detector 704-k can be given by:

$$p_k^\theta(n) = \left[e_k^Q(n)\text{sign}\{\hat{a}_k^I(n)\} - e_k^I(n)\text{sign}\{\hat{a}_k^Q(n)\}\right], \text{ where} \qquad (37)$$

$$\text{sign}(x) = \begin{cases} 1 & \text{if } x \geq 0 \\ -1 & \text{if } x < 0 \end{cases}. \qquad (38)$$

The output signal from phase detector 704-k can be input to a $2^{nd}$ order loop filter 706-k with a transfer function given by $$L(z) = \alpha_\theta + \beta_\theta \frac{z^{-1}}{1-z^{-1}}, \qquad (39)$$

where $\alpha_\theta$ and $\beta_\theta$ are the loop filter coefficients that determine the carrier tracking loop bandwidth and the damping factor. Thus, the output signal from loop filter 706-k is given by $$L_k^\theta(n) = \alpha_\theta p_k^\theta(n) + I_k^\theta(n), \text{ where}$$

$$I_k^\theta(n) = I_k^\theta(n-1) + \beta_\theta p_k^\theta(n-1). \qquad (40)$$

The output signal from loop filter 706-k is then input to a digitally implemented integrator 708-k. The output signal from integrator 708, $\hat{\theta}_k(n+1)$, is then given by $$\hat{\theta}_k(n+1) = \hat{\theta}_k(n) + L_k^\theta(n). \qquad (41)$$

The carrier tracking loop output signal $\hat{\theta}_k(n)$, output from integrator 708-k, is then input to phase rotation circuit 512-k of FIG. 5D.

Further, as shown in FIG. 7, the parameter $\theta_k^c(n+1)$ can be calculated by phase detector 720-k and integrator 722-k as described in Equation 21. As described above, the parameter $\eta_k^c(n+1)$ input into multiplier 533-k shown in FIG. 5D. can be calculated by blocks 723 and integration block 724 according to Equation 20.

As shown in Blocks 725-k and 726-k, the offset values $\text{OFFSET}_2^I$ and $\text{OFFSET}_1^Q$ input to summers 534-k and 536-k, respectively, of the embodiment of digital filter 562-k shown in FIG. 5D can be determined by integrating the signals $F_k^I(n)$ and $F_k^Q(n)$, respectively. Similarly, the offset values $\text{OFFSET}_2^I$, and $\text{OFFSET}_2^Q$ input to summers 541-k and 542-k, respectively, of digital filter 563-k shown in FIG. 5E can be calculated by integrating the signals $G_k^I(n)$ and $G_k^Q(n)$, respectively. The embodiment of adaptive parameter block 517-k shown in FIG. 7 calculates $\text{OFFSET}_2^I$ and $\text{OFFSET}_2^Q$ by integrating the error signals $e_k^I(n)$ and $e_k^Q(n)$, respectively.

Further, the coefficient $\hat{\theta}_k^{(2)}$ to quadrature correction 540-k of FIG. 5E can be calculated by phase detector 729-k and integrator 731-k. The output signal from phase detector 729-k can be calculated by $$P_k^{\theta 2} = -\text{sign}(\hat{a}_k^I(n))e_k^Q(n) - \text{sign}(\hat{a}_k^Q(n))e_k^I(n) \qquad (42)$$

The output signal from integrator 731-k, then, can be given by $$\theta_k^{(2)}(n+1) = \theta_k^{(2)}(n) + \alpha_\theta P_k^{\theta 2} \qquad (43)$$

The gains $g_k^{2-I}$ and $g_k^{2-Q}$ can be calculated by phase detector 732 and integrator 734. In some embodiments, phase detector 732-k calculates the quantities $$p_k^{g2-I}(n) = -e_k^I(n)\text{sign}(\hat{a}_k^I(n)) \text{ and}$$

$$p_k^{g2-Q}(n) = -e_k^Q(n) \text{ sign}(\hat{a}_k^Q(n)). \qquad (44)$$

The output signals from integrator 734-k, then, can be given by $$g_k^{2-I}(n+1) = g_k^{2-I}(n) + \alpha_g p_k^{g2-I} \text{ and}$$

$$g_k^{2-Q}(n+1) = g_k^{2-Q}(n) + \alpha_g p_k^{g2-Q}, \qquad (45)$$

where $\alpha_g$ determines how fast the gain values respond to changes.

As show in FIG. 5A, cross-channel adaptive parameter block 571 adaptively adjusts the parameters of cross-channel interference canceller 570, all of the $\sigma_{k,l}^1$ parameters of Equations 26 and 27. In an embodiment where the cross-channel transfer functions $Q_{k,l}$ is a 5 tap function and K=8, there are 5*K*(K-1)=280 individual complex parameters $\sigma_{k,l}^1$ to adjust in Equations 27 and 28.

In some embodiments, cross-channel adaptive parameter block 571 receives the complex input values $E_1$ through $E_K$, where $E_k$, an arbitrary one of them, is given by $E_k = E_k^I + iE_k^Q$ (see FIG. 5F), and error signals $\{e_k(n) = e_k^I(n) + ie_k^Q(n)\}$ from decision unit 516-k of each of receivers 222-1 through 222-K. On start-up of receiver system 220-p, all of complex parameters $\sigma_{k,l}^J$ can be set to 0. Each of complex parameters $\sigma_{k,l}^J$ can then be updated according to $$\sigma_{k,l}^{m-x}(n+1) = \sigma_{k,l}^{m-x}(n) - \upsilon_{k,l}^{m-x}(e_l^Q(n)E_k^I(n-m) + e_l^Q(n)E_k^Q(n-m)), \text{ and} \qquad (46)$$

$$\sigma_{k,l}^{m-y}(n+1) = \sigma_{k,l}^{m-y}(n) - \upsilon_{k,l}^{m-y}(e_l^Q(n)E_k^Q(n-m) - e_l^I(n)E_k^Q(n-m)), \text{ where} \qquad (47)$$

$$\sigma_{k,l}^{m-y} = \sigma_{k,l}^{m-x} + i\sigma_{k,l}^{m-y}, \text{ and} \qquad (48)$$

where $\upsilon_{k,l}{}^m = \upsilon_{k,l}{}^{m,x} + i\upsilon_{k,l}{}^{m,y}$ is the complex update coefficient for parameter ck and controls how fast parameter $\upsilon_{k,l}{}^{m,x}$ can change, in similar fashion as has been described with other update equations above. In some embodiments, all of the parameters $\upsilon_{k,l}{}^{m,x}$ and $\upsilon_{k,l}{}^{m,y}$ each have values on the order of $10^{-3}$ to $10^{-5}$.

In some embodiments, frequency shift 563 generates a reference signal input to PLL 523 such that the frequency of component 201-p with receiver system 220-p, $f_1$ through $f_K$, matches the frequency of the corresponding component 201-q with transmitter system 210-q, $f_1$ through $f_K$, where component 201-q is transmitting data to component 201-p. In embodiments where $f_1$ through $f_K$ correspond to frequencies $f_0$ through $Kf_0$, respectively, then frequency shift 563 shifts the frequency of a reference clock such that the frequency shift $\Delta$ is zero. The frequencies $f_1$ through $f_K$, then, are also frequencies $f_0$ through $Kf_0$. In some embodiments, frequency shift 563 can receive input from any or all loop filters 706-k (FIG. 7) and adjusts the frequency shift such that $\hat{\theta}_k^{(1)}$ through $\hat{\theta}_k^{(K)}$ remain a constant, for example 0 or any other angle. In some embodiments, frequency shift 563 receives the output signals from any or all loop filters 70k.

As shown in FIG. 5A, the output signals from digital filter 563-k, equalized samples $\{G_k^I(n), G_k^Q(n)\}$, are input to trellis decoder 514-k. Trellis decoding can be performed using the Viterbi algorithm, see, e.g., G. Ungerboeck., "Channel Coding with Multilevel/Phase Signals," IEEE Transactions on Information Theory, vol. IT-28, January 1982, pp. 55-67, G. Ungerboeck., "Trellis Coding Modulation with Redundant Signal Sets, Part I. Introduction," IEEE Communications Magazine, vol. 25, no. 2, February 1987, pp. 5-11, G. Ungerboeck., "Trellis Coding Modulation with Redundant Signal Sets, Part II. State of the Art," IEEE Communications Magazine, vol. 25, no. 2, February 1987, pp. 12-21, or G. C. CLARK, JR., AND J. B. CAIN, ERROR CORRECTION CODING FOR DIGITAL COMMUNICATIONS, PP. 253-264 (Plenum Press, New York, 1981). Additionally, trellis decoder 514 converts from the QAM symbol set back to parallel bits. The output signal from trellis decoder 514, which now contains $n_k$ parallel bits, is input to descrambler 515-k. Descrambler 515-k of receiver demodulator 222-k operates to reverse the scrambling operation of scrambler 401 of transmitter modulator 212-k.

As is shown in FIG. 2C, the output signals from each of demodulators 222-1 through 222-K are recombined into an N-bit parallel signal in bit parsing 221. Additionally, the RX clock signal is output from bit parsing 221.

Figure 10A:
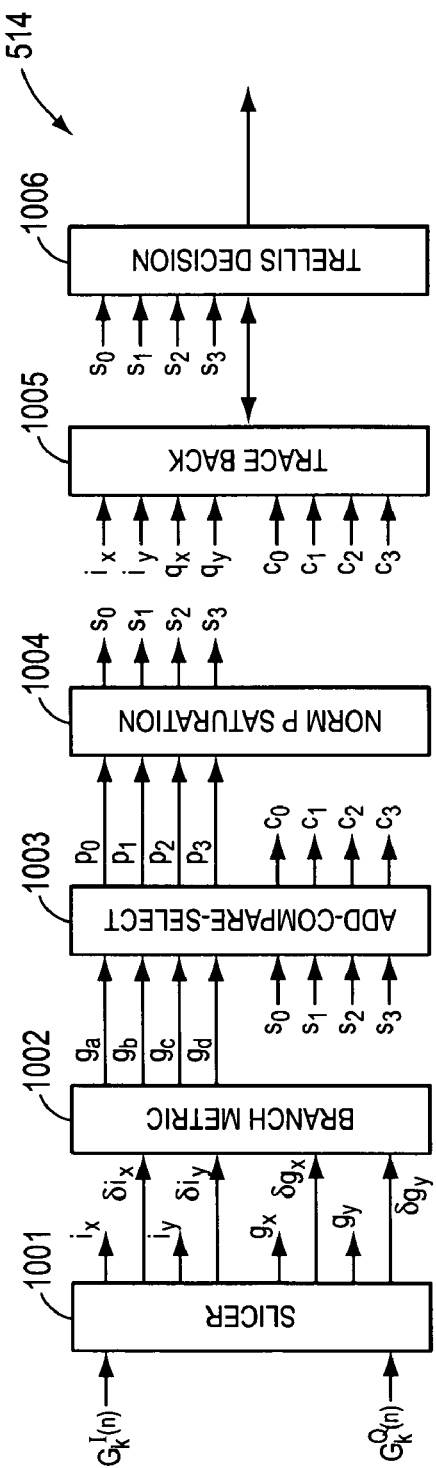
FIGS. 10A, 10B and 10C illustrate an embodiment of a trellis decoder.

FIG. 10 shows an example embodiment of trellis decoder 514 according to the present invention. Trellis decoder 514 of FIG. 10A includes a slicer 1001, a branch metric 1002, an add-compare-select (ACS) block 1003, a normalization and saturation block 1004, a trace back 1005, and a trellis decision block 1006. The output signal from trellis decoder 514 is the received bits, which are substantially as transmitted by transmitter 210-p.

Figure 10B:
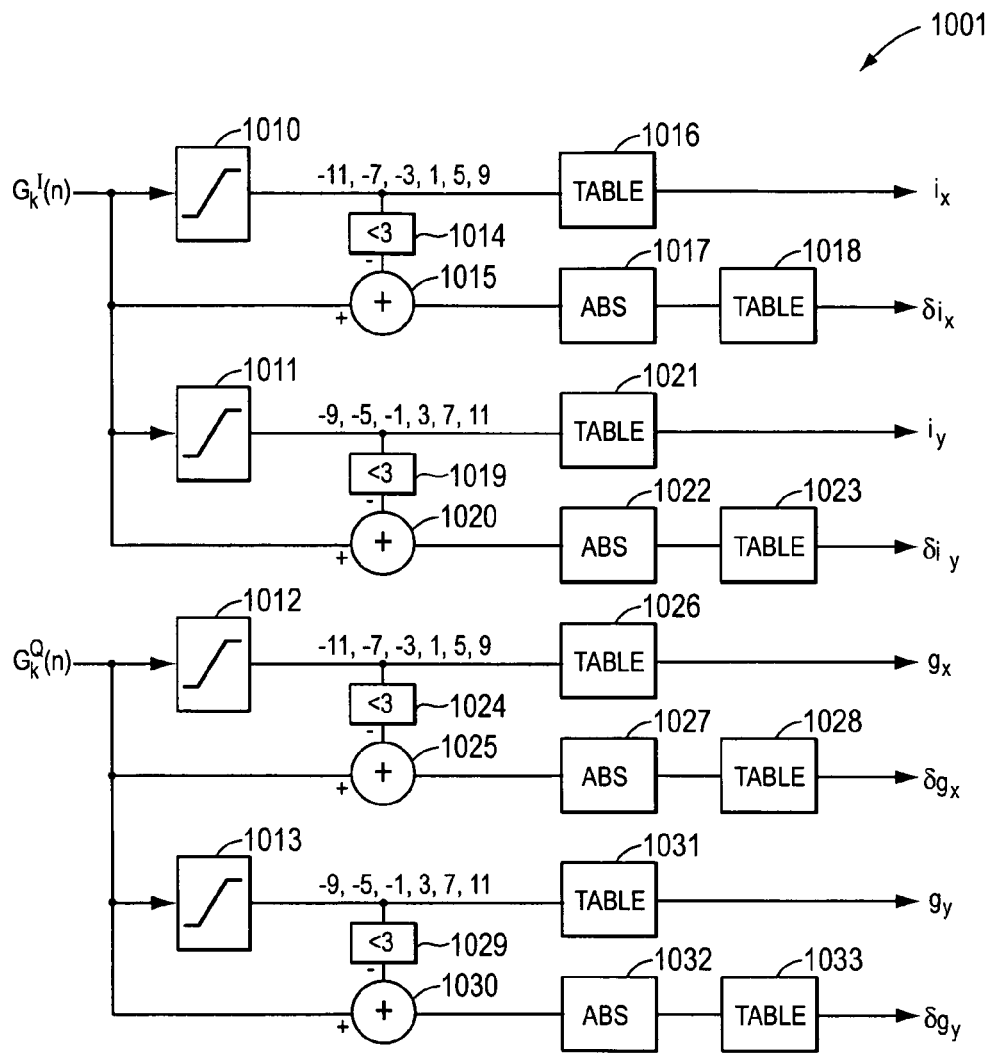
Figure 10C:
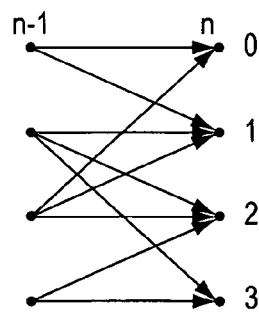

Slicer 1001 receives the output signals $G_k^I(n)$ and $G_k^Q(n)$ from offset blocks 541 and 542, respectively. FIG. 10B shows an embodiment of slicer 1001. The value $G_k^I(n)$ is received in x and y slicers 1010 and 1011, respectively. Slicer 1010 slices $G_k^I(n)$ to a first set of symbol values while slicer 1011 slices $G_k^I(n)$ to a second set of slicer values. For example, in a 128 QAM system as shown in Table I, x-slicer 1010 can slice to the symbol values −11, −7, −3, 1, 5, and 9 and y-slicer 1011 can slice to the symbol values −9, −5, −1, 3, 7, 11. In some embodiments, the number of bits can be reduced by mapping the decided symbols from slicers 1010 and 1011 using table 1016 and 1021, respectively. The output signal from tables 1016 and 1021, then, are $i_x$ and $i_y$, indicating decisions based on the input value $G_k^I(n)$.

TABLE II

| INPUT | 0–8 | 9, 10 | 11, 12, 13 | >14 |
|---|---|---|---|---|
| OUPUT | 0 | 1 | 2 | 3 |

The errors $\delta i_x$ and $\delta i_y$ are also calculated. The output signals from slicers 1010 and 1011 are subtracted from the input signal $G_k^I(n)$ in summers 1015 and 1020, respectively. In some embodiments, the output signals from slicers 1010 and 1011 are input to blocks 1014 and 1019, respectively, before subtraction in summers 1015 and 1020. Blocks 1014 and 1019 represent shifts. In some embodiments, the input signals to slicers 1010 and 1011 are 8-bit signed numbers. The value 8 slices to a perfect 1. Similarly, the value −56 slices to a perfect −7. So if the input signal is a −56 it would be sliced to −7. To calculate the error, we need to multiply the −7 by 8 before it is subtracted from the incoming signal. Multiplying by 8 is the same as a shift to the left by 3.

The absolute values of the output signals from summers 1015 and 1020 are then taken by blocks 1017 and 1022, respectively. The output signal from ABS blocks 1017 and 1022 can be mapped into a set of values requiring a smaller number of bits by tables 1018 and 1023, as in Table II above, respectively, to generate $\delta i_x$ and $\delta i_y$, respectively.

The output signals corresponding to the quadrature data path, $q_x$, $q_y$, $\delta q_x$ and $\delta q_y$, are generated by substantially identical procedure by slicers 1012, 1013, summers 1025, 1030, and blocks 1024, 1026, 1027, 1028, 1029, 1031, 1032 and 1033.

Branch metric 1002 receives the error signals from slicer 1001 and calculates the signals $\delta a$, $\delta b$, $\delta c$, and $\delta d$. The branch metric values $\delta a$, $\delta b$, $\delta c$, and $\delta d$ indicate the path metric errors. In some embodiments, the path metric errors $\delta a$, $\delta b$, $\delta c$, and $\delta d$ can be calculated as $$\delta a = \delta i_x + \delta q_x,$$

$$\delta b = \delta i_y + \delta q_x,$$

$$\delta c = \delta i_x + \delta q_y,$$

$$\delta d = \delta i_y + \delta q_y. \quad (49)$$

Add-Compare Select 1003 receives the path metrics $\delta a$, $\delta b$, $\delta c$, and $\delta d$ along with state metric values $s_0$, $s_1$, $s_2$ and $s_3$, which are calculated in normalization and saturation block 1004. In some embodiments, the output values of ACS 1003 include path metrics $p_0$, $p_1$, $p_2$ and $p_3$ along with choice indicators $c_0$, $c_1$, $c_2$ and $c_3$. The path metrics $p_0$, $p_1$, $p_2$ and $p_3$ can be given by $$p_0 = \mathrm{MIN}\,(s_0 + \delta a, s_2 + \delta d),$$

$$p_1 = \mathrm{MIN}\,(s_0 + \delta d, s_2 + \delta a),$$

$$p_2 = \mathrm{MIN}\,(s_1 + \delta b, s_3 + \delta c), \text{ and}$$

$$p_3 = \mathrm{MIN}\,(s_1 + \delta c, s_3 + \delta b). \quad (50)$$

The choice indicators $c_0$, $c_1$, $c_2$ and $c_3$ indicate which of the values was chosen in each of the minimization in Equation 43.

Normalization and saturation 1004 receives the path metrics $p_0$, $p_1$, $p_2$ and $p_3$ and calculates the state metrics $s_0$, $s_1$, $s_2$ and $S_3$. In some embodiments, if the path metrics are above a threshold value, the threshold value is subtracted from each of the path metrics. In some embodiments, the smallest path metric can be subtracted from each of the path metrics $p_0, p_1, p_2$ and $p_3$. Normalization and Saturation block 1004 also ensures that path metrics $p_0, p_1, p_2$ and $p_3$ are limited to a maximum value. For example, in an embodiment where $p_0, p_1, p_2$ and $p_3$ are a four-bit number (range 0-15), if $p_0, p_1, p_2$ or $p_3$ is greater than 15, then the corresponding path metric is limited to the maximum value of 15. Then, the state metrics for the next baud period, $s_0, s_1, s_2$, and $s_3$, are set to the path metrics $p_0, p_1, p_2$ and $p_3$.

Traceback 1005 receives and stores the choice indicators $c_0, c_1, c_2$ and $c_3$ as well as the decided values from slicer 1001 in that baud period, $i_x, i_y, q_x$, and $q_y$. The choice indicators $c_0, c_1, c_2$ and $C_3$ indicate the previous state values. As shown in the state transition diagram of FIG. 10C, which indicates state transitions between the encoded bits, for each of the states 0-3, there are only two possible previous states 0-3. For example, if the current state is 1, the previous state was either 0 or 2. Although any traceback depth can be utilized in traceback 1005, in some embodiments a traceback depth of 6 is utilized. With the use of mapping tables 1016, 1021, 1026 and 1031 reducing the number of bits required to store $i_x, i_y, q_x$, and $q_y$, (for example a total of 8 in 128 QAM systems) and the low number of bits required to store choice indicators $c_0, c_1, c_2$ and $c_3$, a low number of bits is needed. For example, in some embodiments a total of 12 bits is utilized.

For calculating the trellis output from trace back 1005, the most recently stored memory locations are utilized first with the first choice being the state with the lowest state metric. The algorithm then traces back through the stored choice indications $c_0, c_1, c_2$ and $c_3$ to the end of the traceback memory (in some embodiments, the sixth state) and arrives at state S. In the example trellis discussed above, the MSB of the output is the LSB of the state, S. The final state S and the choice indicator $c_S$ will determine which pair of symbols were transmitted $(I_x/I_y, Q_x/Q_y)$. By reading the values of these symbols from the traceback memory, a look-up in, for example, Table I will result in a read value. The five least significant bits of the read value from the look-up table, e.g. Table I, becomes the five least significant bits of the output signal. The most significant bit was determined earlier and supplies the most significant bit (MSB).

Figure 9:
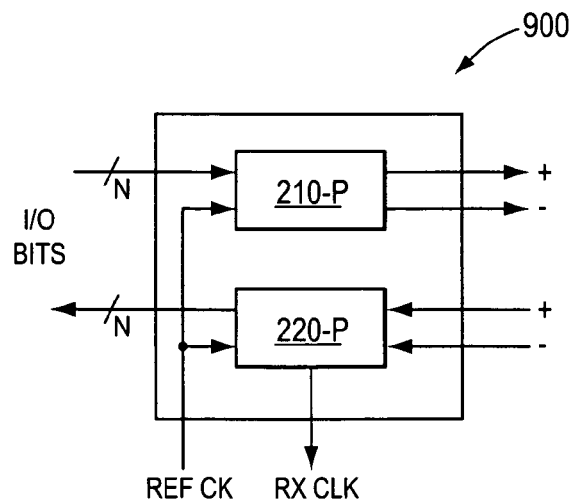
FIG. 9 shows a block diagram of a transceiver chip according to the present invention.

FIG. 9 shows a transceiver chip 900 according to the present invention. Transceiver chip 900 includes transmitter 210-p and receiver 220-p formed on a single semiconductor chip. In some embodiments, transceiver chip 900 is formed in silicon using CMOS technology. Transceiver chip 900 can receive N bits into transmitter 210-p and output N bits from receiver 220-p. In some embodiments, different pins may be utilized for input bits and output bits, as shown in FIG. 9. In some embodiments, transmitter 210-p and receiver 220-p share the same N pins. Transmitter 900 receives a reference clock signal and outputs a receive clock signal from receiver 220-p. Further, transceiver 220 includes output pins for transmitting and receiving differential signals. In some embodiments, transmitter 210-p and receiver 220-p share the same output pins and in some embodiments transmitter 210-p and receiver 220-p are coupled to separate output pins. In some embodiments, transceiver chip 900 may be coupled to an optical driver for optical transmission.

Although the digital algorithms described in this disclosure are presented as digital circuitry elements, one skilled in the art will recognize that these algorithms can also be performed by one or more digital processors executing software code to perform the same functions.

The embodiments of the invention described above are exemplary only and are not intended to be limiting. One skilled in the art will recognize various modifications to the embodiments disclosed that are intended to be within the scope and spirit of the present disclosure. As such, the invention is limited only by the following claims.

TABLE I

|  |  |  |  | 47 | 111 | 43 | 107 | 59 | 123 | 63 | 127 |  |  | 11 |
|---|---|---|---|----|-----|----|-----|----|-----|----|-----|----|-----|----|
|  |  |  |  | 15 | 79  | 11 | 75  | 27 | 91  | 31 | 95  |    |     | 9  |
|  |  | 42 | 106 | 45 | 109 | 41 | 105 | 57 | 121 | 61 | 125 | 58 | 122 | 7  |
|  |  | 10 | 74  | 13 | 77  | 9  | 73  | 25 | 89  | 29 | 93  | 26 | 90  | 5  |
|  |  | 46 | 110 | 44 | 108 | 40 | 104 | 56 | 120 | 60 | 124 | 62 | 126 | 3  |
|  |  | 14 | 78  | 12 | 76  | 8  | 72  | 24 | 88  | 28 | 92  | 30 | 94  | 1  |
|  |  | 38 | 102 | 36 | 100 | 32 | 96  | 48 | 112 | 52 | 116 | 54 | 118 | -1 |
|  |  | 6  | 70  | 4  | 68  | 0  | 64  | 16 | 80  | 20 | 84  | 22 | 86  | -3 |
|  |  | 34 | 98  | 37 | 101 | 33 | 97  | 49 | 113 | 53 | 117 | 50 | 114 | -5 |
|  |  | 2  | 66  | 5  | 69  | 1  | 65  | 17 | 81  | 21 | 85  | 18 | 82  | -7 |
|  |  |    |     | 39 | 103 | 35 | 99  | 51 | 115 | 55 | 119 |    |     | -9 |
|  |  |    |     | 7  | 71  | 3  | 67  | 19 | 83  | 23 | 87  |    |     | -11 |
| -11 | -9 | -7 | -5 | -3 | -1 | 1 | 3 | 5 | 7 | 9 | 11 | I/Q |

We claim:

1. A transmission system, comprising:
   a plurality of demodulators, each of the plurality of demodulators receiving signals from one of a plurality of transmission bands, the plurality of transmission bands being transmitted on a single differential conductive pair; and
   a cross-channel interference canceller coupled to the plurality of demodulators, the cross-channel interference canceller coupled to receive the signals from all of the plurality of transmission bands transmitted on the differential conductive pair.

2. The system of claim 1, wherein at least one of the plurality of demodulators comprises:
   a down converter that converts an input signal from the one of the plurality of transmission bands to a base band;
   a filter coupled to receive signals from the down converter, the filter substantially filtering out signals not in the base band;
   an analog-to-digital converter coupled to receive signals from the filter and generate digitized signals;
   an equalizer coupled to receive the digitized signals; and
   a trellis decoder coupled to receive signals from the equalizer and generate recreated data, the recreated data being substantially the same data transmitted by a corresponding modulator.

3. The system of claim 2, wherein the down-converter creates an in-phase signal and a quadrature signal, the in-phase signal being the input signal multiplied by a cosine function at the frequency of the one of the plurality of transmission bands and the quadrature signal being the input signal multiplied by a sine function at the frequency of the one of the plurality of transmission bands.

4. The system of claim 3, whererin the filter includes an in-phase filter filtering the in-phase signal and a quadrature filter filtering the quadrature signal.

5. The system of claim 3, further including an offset block coupled between the down-converter and the filter, the offset block offsetting the in-phase signal and the quadrature signal such that signals output from the analog-to-digital converter averages zero.

6. The system of claim 3, further including an amplifier coupled between the filter and the analog-to-digital converter, the amplifier amplifying an in-phase filtered signal from the in-phase filter and a quadrature filter signal from the quadrature filter such that the analog-to-digital convener is filled.

7. The system of claim 6, wherein an in-phase gain of the amplifier and the quadrature gain of the amplifier ate adaptively chosen in an automatic gain controller.

8. The system of claim 7, wherein the automatic gain controller sets the in-phase gain and the quadrature gain based on the digitized signals from the analog to digital converters.

9. The system of claim 8, wherein the in-phase gain and the quadrature gain are equal.

10. The system of claim 3, wherein the analog-to-digital convener includes a first analog-to-digital converter coupled to receive signals from the in-phase filter and a second analog-to-digital converter coupled to receive signals from the quadrature filter.

11. The system of claim 2, further including a correction circuit coupled between the analog-to-digital converter and the equalizer.

12. The system of claim 11, wherein the correction circuit includes an adjustment to correct phases between the in-phase signal and die quadrature signal.

13. The system of claim 12, wherein a the correction includes that a first coefficient times one of the in-phase signal and the quadrature signal is added to the opposite one of the in-phase signal and the quadrature signal.

14. The system of claim 13, wherein the correction includes that a second factor times the opposite one of the in-phase signal and the quadrature signal is added to the opposite one of the in-phase signal and the quadrature signal.

15. The system of claim 14, wherein the first factor and the second factor are adaptively chosen.

16. The system of claim 15, wherein the first factor is a function of in-phase and quadrature output signals from die correction circuit.

17. The system of claim 16, wherein the second factor is a function of the ratio between in-phase and quadrature signals from the correction Circuit.

18. The system of claim 3, wherein a phase rotator circuit is coupled between the analog-to-digital converter and the equalizer.

19. The system of claim 18, wherein a parameter of the phase rotator circuit is adaptively chosen.

20. The system of claim 3, wherein an amplifier is coupled between the equalizer and the trellis decoder.

21. The system of claim 20, wherein a quadrature correction is coupled between the amplifier and the trellis decoder.

22. The system of claim 21, wherein an offset circuit is coupled between the quadrature correction and the trellis decoder.

23. The system of claim 20, wherein an in-phase gain and a quadrature gain of the amplifier are adaptively chosen from error signals calculated from sliced values.

24. The system of claim 23, wherein the sliced values are determined from input signals to the trellis decoder.

25. The system of claim 21, wherein a parameter of the quadrature correction is adaptively chosen.

26. The system of claim 22, wherein a parameter of the offset circuit is adaptively chosen.

27. The system of claim 2, wherein the equalizer is a complex equalizer executing a transfer function, the transfer function having parameters $C_k^x(j)$ and $C_k^x(j)$ where j is an integer.

28. The system of claim 2, wherein the equalizer is a complex equalizer executing a transfer function, the transfer function having parameters $C_k^{x,I}(n)$, $C_k^{y,I}(n)$, $C_k^{x,Q}(n)$ and $C_k^{y,Q}(n)$, where n is an integer indicating the clock cycle, and k is an integer indicating the transmission band.

29. The system of claim 27, wherein the center parameters $C_k^x(j)$ (0) and $C_k^y(0)$ are fixed.

30. The system of claim 29, wherein $C_k^x(0)$ is one and $C_k^y(0)$ is zero.

31. The system of claim 29, wherein the parameters $C_k^x(-1)$ and $C_k^y(-1)$ are fixed.

32. The system of claim 1, wherein the cross-channel interference canceller provides transfer functions coupled between pairs of transmission bands so that each of the plurality of transmission bands can be corrected for cross-channel interference.

33. The system of claim 32, wherein the transfer functions includes one or more time delays.

34. The system of claim 32, wherein coefficients of the transfer functions are adaptively chosen.

35. The system of claim 1, wherein an operating frequency of the plurality of receivers is adjusted to match that of a corresponding plurality of modulators transmitting data into the transmission bands.

36. A method of transmitting data, comprising:
receiving a transmitted signal from a single conductive pair into a plurality of demodulators;
each of the plurality of demodulators down-convening the transmission signal by a set carrier frequency to receive one of a plurality of transmission bands; and
cancelling the cross-channel interference in each of the plurality of demodulators by correcting each received signal corresponding to the plurality of transmission bands with signals received from all of the other ones of the plurality of demodulators.

37. The method of claim 36, wherein cancelling the cross-channel interference in each of the plurality of demodulators includes:
receiving equalized signals from each of the plurality of demodulators; and
subtracting components of the equalized signals from each of the plurality of demodulators from the received signal in each of the other demodulators.

38. The method of claim 37, wherein subtracting components of the equalized signals includes providing a transfer function between each of the plurality of demodulators.

39. The method of claim 38, wherein the transfer function includes a multi-tap transfer function.

40. The method of claim 39 wherein coefficients of the transfer function are adaptively chosen.

41. A transmission system, comprising:
- means for transmitting data into multiple channels on a single differential conductive pair, each of the multiple channels having a carrier frequency;
- means for receiving data from the single differential conductive pair;
- means of down-convening data from each of the multiple channels;
- means for digitizing the data from each of the multiple channels;
- means for equalizing the data from each of the multiple channels to correct for intersymbol interference;
- means for correcting the data from each of the multiple channels for cross-channel interference, the means for correcting including means for receiving data from all of the other multiple channels; and
- means for providing recovered data based on the corrected and equalized data from each of the multiple channels.

* * * * *

UNITED STATES PATENT AND TRADEMARK OFFICE
CERTIFICATE OF CORRECTION

PATENT NO. : 7,236,757 B2
APPLICATION NO. : 10/071771
DATED : June 26, 2007
INVENTOR(S) : Sreen A. Raghavan et al.

It is certified that error appears in the above-identified patent and that said Letters Patent is hereby corrected as shown below:

In claim 4, column 33, line 8, "whererin" should read --wherein--.

In claim 6, column 33, line 20, "convener" should read --converter--.

In claim 7, column 33, line 23, "ate" should read --are--.

In claim 10, column 33, line 32, "convener" should read --converter--.

In claim 12, column 33, line 42, "die" should read --the--.

In claim 13, column 33, line 43, "wherein a the correction" should read --wherein the correction--.

In claim 16, column 33, line 55, "die" should read --the--.

In claim 17, column 33, line 59, "correction Circuit." should read --correction circuit.--.

In claim 27, column 34, line 18, "$C_k^x(j)$ and $C_k^x(j)$" should read -- $C_k^x(j)$ and $C_k^y(j)$ --.

In claim 28, column 34, line 22, "$C_k^{x,1}(n), C_k^{y,1}(n),$" should read -- $C_k^{x,I}(n), C_k^{y,I}(n),$ --.

In claim 29, column 34, line 26, "$C_k^x(j)(0)$" should read -- $C_k^x(0)$ --.

In claim 33, column 34, lines 36-37, "transfer functions includes" should read --transfer functions include--.

In claim 36, column 34, line 47, "down-convening" should read --down-converting--.

UNITED STATES PATENT AND TRADEMARK OFFICE
CERTIFICATE OF CORRECTION

PATENT NO. : 7,236,757 B2
APPLICATION NO. : 10/071771
DATED : June 26, 2007
INVENTOR(S) : Sreen A. Raghavan et al.

It is certified that error appears in the above-identified patent and that said Letters Patent is hereby corrected as shown below:

In claim 41, column 35, line 9, "down-convening" should read --down-converting--.

Signed and Sealed this

Ninth Day of October, 2007

JON W. DUDAS
*Director of the United States Patent and Trademark Office*